United States Patent
Kojima et al.

(10) Patent No.: US 9,747,511 B2
(45) Date of Patent: Aug. 29, 2017

(54) IMAGE RECOGNITION DEVICE, IMAGE RECOGNITION METHOD, PROGRAM, AND RECORDING MEDIUM

(71) Applicant: MITSUBISHI HEAVY INDUSTRIES, LTD., Tokyo (JP)

(72) Inventors: Yohei Kojima, Tokyo (JP); Kiichi Sugimoto, Tokyo (JP); Takuma Okazaki, Tokyo (JP); Kenta Nakao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 14/442,715

(22) PCT Filed: Mar. 27, 2013

(86) PCT No.: PCT/JP2013/059061
§ 371 (c)(1),
(2) Date: May 13, 2015

(87) PCT Pub. No.: WO2014/076979
PCT Pub. Date: May 22, 2014

(65) Prior Publication Data
US 2016/0132742 A1 May 12, 2016

(30) Foreign Application Priority Data

Nov. 16, 2012 (JP) .................................. 2012-251806

(51) Int. Cl.
*G06K 9/32* (2006.01)
*G06T 7/11* (2017.01)
*G06T 7/136* (2017.01)

(52) U.S. Cl.
CPC ........... *G06K 9/325* (2013.01); *G06K 9/3258* (2013.01); *G06T 7/11* (2017.01); *G06T 7/136* (2017.01); *G06K 2209/15* (2013.01)

(58) Field of Classification Search
CPC combination set(s) only.
See application file for complete search history.

(56) References Cited

U.S. PATENT DOCUMENTS 6,281,928 B1 * 8/2001 Umezaki ............... G06T 7/0042
348/148
8,290,265 B2 * 10/2012 Gao .................... G06K 9/00791
382/173

(Continued)

FOREIGN PATENT DOCUMENTS

JP   64-88210 A   4/1989
JP   4-169987 A   6/1992

(Continued)

OTHER PUBLICATIONS

International Search Report mailed May 14, 2013, corresponding to International patent application No. PCT/JP2013/059061.

(Continued)

*Primary Examiner* — Anand Bhatnagar
(74) *Attorney, Agent, or Firm* — Kanesaka Berner and Partners LLP

(57) ABSTRACT

An image recognition device includes an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value and a vehicle number plate region extraction unit configured to (Continued)

extract a region of the vehicle number plate from the image based on a distribution of the points assigned by the edge direction evaluation unit.

8 Claims, 15 Drawing Sheets

(56) References Cited

U.S. PATENT DOCUMENTS

| | | | |
|---|---|---|---|
| 8,320,629 B2 * | 11/2012 | Hofman | G06K 9/3258 382/105 |
| 9,007,215 B2 * | 4/2015 | Zhu | G06K 19/07749 340/568.1 |
| 9,460,367 B2 * | 10/2016 | Kozitsky | G06K 9/627 |
| 2006/0123051 A1 * | 6/2006 | Hofman | G06K 9/3258 |
| 2008/0131001 A1 * | 6/2008 | Hofman | G06K 9/3258 382/182 |
| 2014/0254866 A1 * | 9/2014 | Jankowski | G06K 9/00771 382/103 |
| 2014/0254878 A1 * | 9/2014 | Jankowski | H04L 63/08 382/105 |

FOREIGN PATENT DOCUMENTS

| | | |
|---|---|---|
| JP | 8-329252 A | 12/1996 |
| JP | 2893814 B2 | 5/1999 |
| JP | 11-339017 A | 12/1999 |
| JP | 3679958 B2 | 8/2005 |

OTHER PUBLICATIONS

Written Opinion mailed May 14, 2013, corresponding to International patent application No. PCT/JP2013/059061.

* cited by examiner

| COORDINATES | POINTS |
|---|---|
| (i01, j01) | 0 |
| (i02, j01) | 0 |
| (i03, j01) | 1 |
| ⋮ | ⋮ |

| START POINT COORDINATES | END POINT COORDINATES | POINTS |
|---|---|---|
| (i11, j11) | (i12, j12) | N1 |
| (i21, j21) | (i22, j22) | N2 |
| (i31, j31) | (i32, j32) | N3 |
| ⋮ | ⋮ | ⋮ |

IMAGE RECOGNITION DEVICE, IMAGE RECOGNITION METHOD, PROGRAM, AND RECORDING MEDIUM

RELATED APPLICATIONS

The present application is a National Phase of International Application Number PCT/JP2013/059061, filed Mar. 27, 2013, which claims priority to Japanese Application Number 2012-251806, filed Nov. 16, 2012.

TECHNICAL FIELD

The present invention relates to an image recognition device, an image recognition method, a program, and a recording medium. More particularly, the present invention relates to an image recognition device for extracting a region of a vehicle number plate from an image, an image recognition method, a program for causing a computer to function as the image recognition device, and a recording medium recording the program.

Priority is claimed on Japanese Patent Application No. 2012-251806, filed Nov. 16, 2012, the content of which is incorporated herein by reference.

BACKGROUND ART

Because vehicle number information is a key for identifying an individual vehicle, the vehicle number information is applied for various purposes. Here, a vehicle number is a character string assigned to the individual vehicle.

Because vehicles are targeted in vehicle number recognition in various environments such as a general road, a highway, a parking lot entrance, and the like, it is necessary to capture an unblurred precise image quickly without being affected by weather conditions or the like. Further, in the vehicle number recognition, an image recognition device for implementing an algorithm for accurately recognizing a vehicle number at a high speed and inexpensively using an obtained image as an input is essential.

As technologies related to this background, various technologies are known (for example, see Patent Literatures 1 and 2).

For example, in Patent Literature 1, a device for automatically identifying a vehicle number of a vehicle that is driving or stopped on a road is disclosed. More specifically, this device photographs a road. Then, the device determines a candidate for a vehicle number plate frame from a captured image. Then, the device determines a candidate for a vehicle number region from the image. Then, the device determines a vehicle number plate position based on an overlap degree between a part surrounded by the vehicle number plate frame estimated based on the candidate for the vehicle number plate frame and the vehicle number region estimated based on the candidate for the vehicle number region. In this manner, because this device can determine the vehicle number plate position from the overlap degree between the candidate for the vehicle number plate frame and the candidate for the vehicle number region, it is possible to perform a vehicle number plate segmentation process with a more reliable probability than when a determination of the vehicle number plate position is made from only a single candidate.

In addition, for example, in Patent Literature 2, a device for performing vehicle number plate recognition of a vehicle is disclosed. More specifically, this device reduces a fetched image in a horizontal direction and a vertical direction. Then, this device subtracts a value of a pixel of a position shifted by a predetermined amount in a positive or negative direction from each pixel from a value of each pixel in the reduced image, binarizes a subtraction result by comparing the subtraction result to a binary threshold value, and makes a pseudo shift and generates a correlation image in a logical product operation between a value at the time of the shift in the positive direction and a value at the time of the shift in the negative direction. Then, this device subtracts a value of a pixel of a position shifted by a predetermined amount in the positive or negative direction from each pixel from a value of each pixel in the reduced image, binarizes a subtraction result by comparing the subtraction result to a binary threshold value, and generates a pseudo logical sum image in a logical sum operation between a value at the time of the shift in the positive direction and a value at the time of the shift in the negative direction. Then, this device divides the pseudo-shift correlation image into a plurality of small regions, calculates an area of pixels of which luminance values are set to 1 among the small regions, and selects a small region of a vehicle number plate candidate based on an area value of each small region. Then, this device temporarily sets the vehicle number plate region on the pseudo logical sum image based on the small region of the vehicle number plate candidate and checks the suitability of the temporarily set region as the vehicle number plate region to segment the vehicle number plate region. In this manner, this device can segment the vehicle number plate region at a high speed and with high precision using a general-purpose calculation device without newly developing a dedicated calculation device and promote the reduction of a development period and the reduction of cost.

CITATION LIST

Patent Literatures

[Patent Literature 1]
 Japanese Patent No. 2893814
[Patent Literature 2]
 Japanese Patent No. 3679958

SUMMARY OF INVENTION

Technical Problem

Incidentally, in a vehicle number recognition system, the number of target vehicles is increasing. Therefore, the vehicle number recognition system requires that a region of a vehicle number plate from which a character is required to be segmented should be extracted at a higher speed so as to recognize the vehicle number at a higher speed.

Solution to Problem

In order to solve the above-described problem, according to a first embodiment of the present invention, an image recognition device is provided for extracting a region of a vehicle number plate from an image, the image recognition device including: an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and a vehicle number plate region extraction unit configured to extract the region of the vehicle number plate from the image based on a distribution of the points assigned by the edge direction evaluation unit.

The image recognition device may further include: an edge intensity determination unit configured to determine whether an intensity of the edge at each coordinate of the image is greater than a predetermined intensity threshold value, wherein the edge direction evaluation unit does not assign points to the coordinate even when the deviation amount between the direction of the outline and the direction of the edge is less than the predetermined deviation amount threshold value if the edge intensity determination unit determines that the intensity of the edge is less than the predetermined intensity threshold value.

The image recognition device may further include: a horizontal distribution totalization unit configured to totalize a distribution of the horizontal direction of the points assigned by the edge direction evaluation unit, wherein the vehicle number plate region extraction unit extracts a region of the horizontal direction of the vehicle number plate from the image based on the distribution of the points of the horizontal direction totalized by the horizontal distribution totalization unit.

The image recognition device may further include: a vertical distribution totalization unit configured to totalize a distribution of a vertical direction of the points assigned by the edge direction evaluation unit, wherein the vehicle number plate region extraction unit extracts a region of the vertical direction of the vehicle number plate from the image based on the distribution of the points of the vertical direction totalized by the vertical distribution totalization unit.

The image recognition device may further include: a regional distribution totalization unit configured to totalize a distribution of each predetermined region of the points assigned by the edge direction evaluation unit, wherein the vehicle number plate region extraction unit extracts the region of the vehicle number plate from the image based on the distribution of the points of each predetermined region totalized by the regional distribution totalization unit.

The edge direction evaluation unit may assign points differing according to the abundance ratio of the direction of the outline when the deviation amount between the direction of the outline and the direction of the edge is less than the predetermined deviation amount threshold value.

According to a second aspect of the present invention, an image recognition method is provided for extracting a region of a vehicle number plate from an image, the image recognition method including: an edge direction evaluation step of evaluating a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and a vehicle number plate region extraction step of extracting the region of the vehicle number plate from the image based on a distribution of the points assigned in the edge direction evaluation step.

According to a third aspect of the present invention, a program is provided for causing a computer to function as an image recognition device for extracting a region of a vehicle number plate from an image, the computer being caused to function as: an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and a vehicle number plate region extraction unit configured to extract the region of the vehicle number plate from the image based on a distribution of the points assigned by the edge direction evaluation unit.

According to a fourth aspect of the present invention, a recording medium recording a program is provided for causing a computer to function as an image recognition device for extracting a region of a vehicle number plate from an image, the computer being caused to function as: an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and a vehicle number plate region extraction unit configured to extract the region of the vehicle number plate from the image based on a distribution of the points assigned by the edge direction evaluation unit.

In addition, the above-described summary of the invention does not necessarily describe all necessary features of the present invention.

The present invention may also be a sub-combination of feature groups described above.

Advantageous Effects of Invention

As is apparent from the above description, it is possible to extract a region of a vehicle number plate from an image at a high speed and accurately according to the present invention.

BRIEF DESCRIPTION OF DRAWINGS

FIG. 13 is a diagram illustrating an example of information stored in an evaluation information storage unit 124 in the form of a table.

FIG. 14 is a diagram illustrating an example of information stored in a regional distribution information storage unit 125 in the form of a table.

DESCRIPTION OF EMBODIMENTS

Although the present invention will now be described through embodiments of the invention, the following embodiments are not intended to limit the invention related to the scope of the present invention. All combinations of features described in the embodiments are not necessarily essential to a resolution means of the invention.

Figure 1:
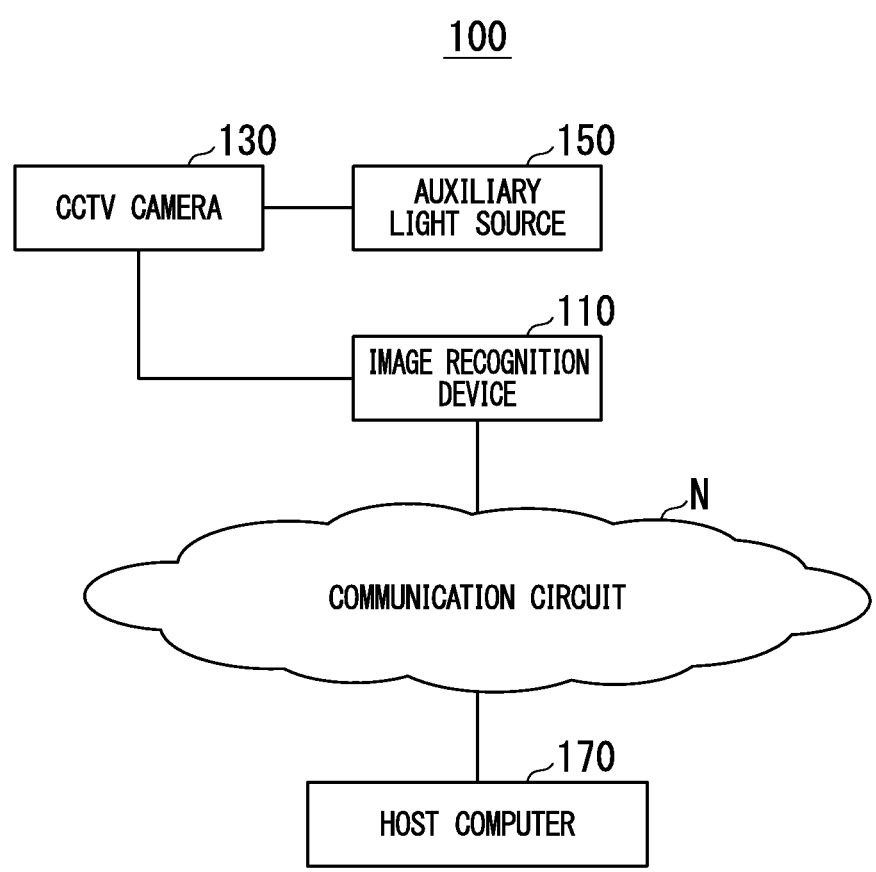
FIG. 1 is a diagram illustrating an example of a use environment of a vehicle number recognition system 100 according to an embodiment.

FIG. 1 illustrates an example of a use environment of a vehicle number recognition system 100 according to an embodiment. The vehicle number recognition system 100 is a system for capturing a video of a front surface portion of a vehicle and recognizing a character of a vehicle number plate from the video.

The vehicle number recognition system 100 includes an image recognition device 110, a closed-circuit television (CCTV) camera 130, an auxiliary light source 150, and a host computer 170.

The image recognition device 110 is a device for extracting a region of a vehicle number plate from the image. The image recognition device 110 is electrically connected to the CCTV camera 130. In addition, the image recognition device 110 establishes a communication connection with the host computer 170 via a communication circuit N. In addition, the communication circuit N includes a computer network such as the Internet, a core network of a communication provider, and various local networks.

The CCTV camera 130 is a device for use in vehicle number recognition. The CCTV camera 130 is electrically connected to the image recognition device 110. For example, the CCTV camera 130 has resolution, sensitivity, and a signal-to-noise (SN) ratio that are sufficient for computer processing on an image.

The auxiliary light source 150 is a device for radiating the illumination of near-infrared light without hindering the driver's vision so that a vehicle number can be recognized at night. The auxiliary light source 150 is electrically connected to the CCTV camera 130. For example, there is a light-emitting diode (LED), a xenon lamp, a halogen lamp, or the like as the auxiliary light source 150.

The host computer 170 is a device for performing a process using information about a vehicle number. The host computer 170 establishes a communication connection to the image recognition device 110 via the communication circuit N. Then, using the information about the vehicle number as the key for identifying an individual vehicle, the host computer 170 performs processes for the measurement of a required time for a vehicle to pass through a specific section in a main road, the determination of a rate type in a toll road, the determination of a contract vehicle in a parking lot, the monitoring of the arrival of a specific vehicle, the acquisition of a use history or the acquisition of customer information, the rapid discovery of a stolen vehicle in emergency deployment, and the like.

In addition, in order to prevent the description from becoming complex in this embodiment, a configuration in which the vehicle number recognition system 100 includes one image recognition device 110, one CCTV camera 130, one auxiliary light source 150, and one host computer 170 will be described. However, the vehicle number recognition system 100 may include a plurality of image recognition devices 110, a plurality of CCTV cameras 130, a plurality of auxiliary light sources 150, and a plurality of host computers 170.

Figure 2:
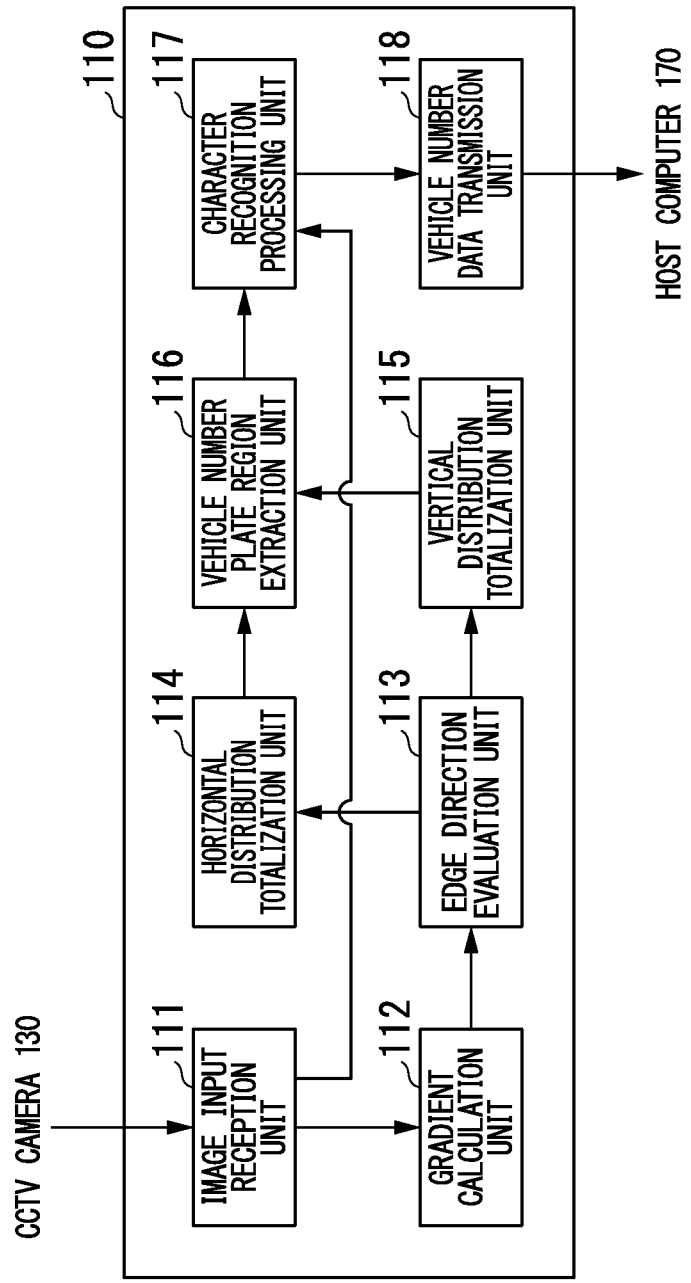
FIG. 2 is a diagram illustrating an example of a block configuration of an image recognition device 110 according to a first embodiment.

FIG. 2 illustrates an example of a block configuration of an image recognition device 110 according to a first embodiment. The image recognition device 110 includes an image input reception unit 111, a gradient calculation unit 112, an edge direction evaluation unit 113, a horizontal distribution totalization unit 114, a vertical distribution totalization unit 115, a vehicle number plate region extraction unit 116, a character recognition-processing unit 117, and a vehicle number data transmission unit 118. In the following description, functions and operations of the components will be described in detail.

The image input reception unit 111 receives an input of an image output from the CCTV camera 130.

The gradient calculation unit 112 calculates a gradient value in each of the horizontal and vertical directions of each coordinate of the image. Here, the calculation of the gradient value is referred to as edge detection. An edge is a point at which a pixel value rapidly changes.

The edge direction evaluation unit 113 evaluates a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value.

The horizontal distribution totalization unit 114 totalizes the distribution of the horizontal direction of the points assigned by the edge direction evaluation unit 113.

The vertical distribution totalization unit 115 totalizes the distribution of the vertical direction of the points assigned by the edge direction evaluation unit 113.

The vehicle number plate region extraction unit 116 extracts a region of the vehicle number plate from the image based on the distribution of the points assigned by the edge direction evaluation unit 113. For example, the vehicle number plate region extraction unit 116 extracts a region of the horizontal direction of the vehicle number plate from the image based on the distribution of the points of the horizontal direction totalized by the horizontal distribution totalization unit 114. In addition, for example, the vehicle number plate region extraction unit 116 extracts a region of the vertical direction of the vehicle number plate from the image based on the distribution of the points of the vertical direction totalized by the vertical distribution totalization unit 115.

The character recognition-processing unit 117 recognizes a vehicle number by performing a character recognition process on the image of the region of the vehicle number plate.

The vehicle number data transmission unit 118 transmits data indicating the vehicle number to the host computer 170.

Figure 3:
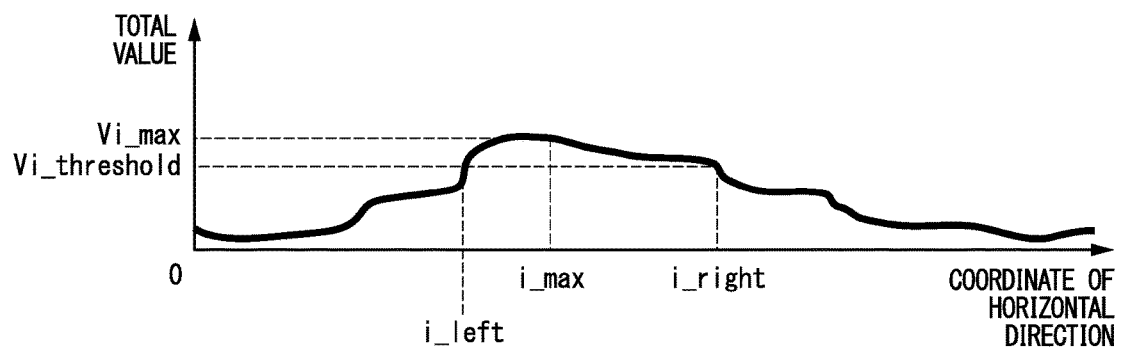
FIG. 3 is a diagram illustrating an example of a distribution of the points of a horizontal direction totalized by a horizontal distribution totalization unit 114 in the form of a graph.

FIG. 3 illustrates an example of a distribution of the points of the horizontal direction totalized by the horizontal distribution totalization unit 114 in the form of a graph. In this embodiment, a coordinate value of the horizontal direction is denoted by i for the image.

In the graph illustrated in FIG. 3, a total value Vi_max is a maximum value of the distribution of the points of the horizontal direction. Then, the coordinate i_max of the horizontal direction is a coordinate of the horizontal direction of the image in which the total value becomes the total value Vi_max.

In addition, the total value Vi_threshold is a value obtained by multiplying the total value Vi_max by a predetermined coefficient α (here, 0<α<1). Further, the coordinate i_left of the horizontal direction is a coordinate of the horizontal direction of the image in which the total value initially becomes the total value Vi_threshold when the distribution of the points of the horizontal direction is searched for in a direction from coordinates of a left end of the image to a right end. In addition, the coordinate i_right of the horizontal direction is a coordinate of the horizontal direction of the image in which the total value initially becomes the total value Vi_threshold when the distribution of the points of the horizontal direction is searched for in a direction from coordinates of the right end of the image to the left end.

Figure 4:
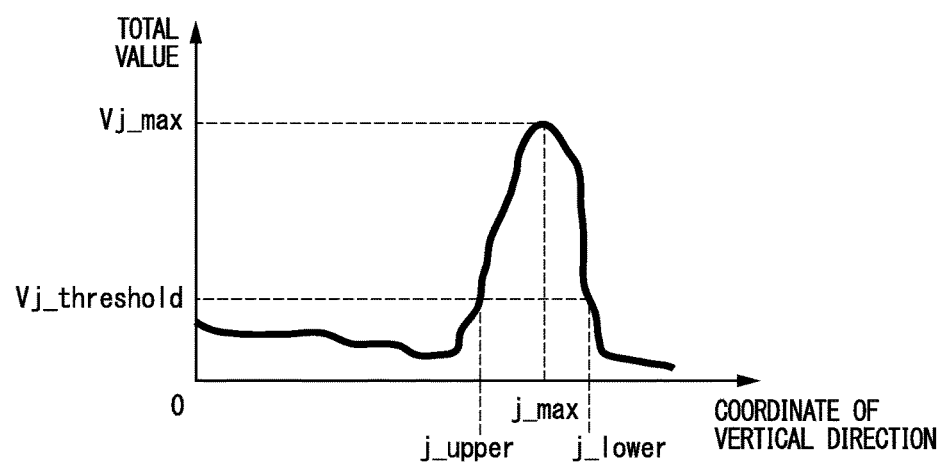
FIG. 4 is a diagram illustrating an example of a distribution of the points of a vertical direction totalized by a vertical distribution totalization unit 115 in the form of a graph.

FIG. 4 illustrates an example of a distribution of the points of the vertical direction totalized by the vertical distribution totalization unit 115 in the form of a graph. In this embodiment, a coordinate value of the vertical direction is denoted by j for the image.

In the graph illustrated in FIG. 4, a total value Vj_max is a maximum value of the distribution of the points of the vertical direction. Further, the coordinate j_max of the vertical direction is a coordinate of the vertical direction of the image in which the total value becomes the total value Vj_max.

In addition, the total value Vj_threshold is a value obtained by multiplying the total value Vj_max by a predetermined coefficient β (here, 0<β<1). Further, the coordinate j_upper of the vertical direction is a coordinate of the vertical direction of the image in which the total value initially becomes the total value Vj_threshold when the distribution of the points of the vertical direction is searched for in a direction from coordinates of an upper end of the image to a lower end. In addition, the coordinate j_lower of the vertical direction is a coordinate of the vertical direction of the image in which the total value initially becomes the total value Vj_threshold when the distribution of the points of the vertical direction is searched for in a direction from coordinates of the lower end of the image to the upper end.

Figure 5:
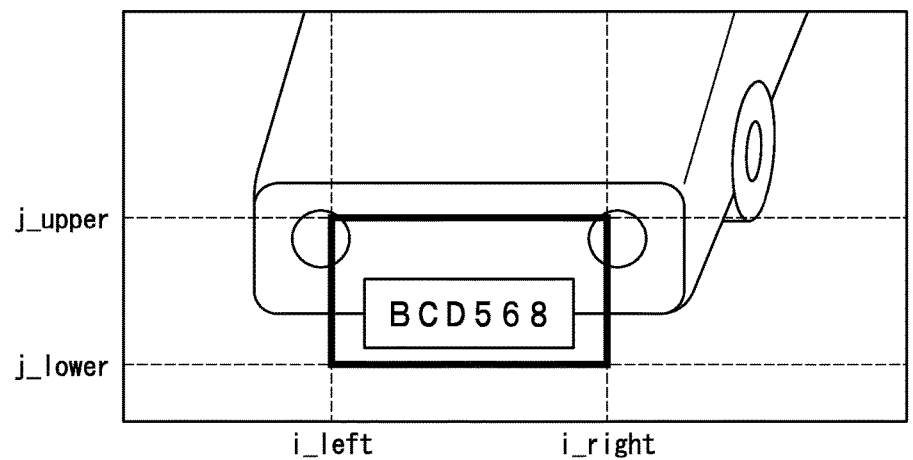
FIG. 5 is a diagram illustrating an example of a region of a vehicle number plate extracted by a vehicle number plate region extraction unit 116.

FIG. 5 illustrates an example of a region of the vehicle number plate extracted by the vehicle number plate region extraction unit 116.

A region of the vehicle number plate extracted by the vehicle number plate region extraction unit 116 is a region surrounded by start point coordinates (i_left, j_upper) and end point coordinates (i_right, j_lower).

Figure 6:
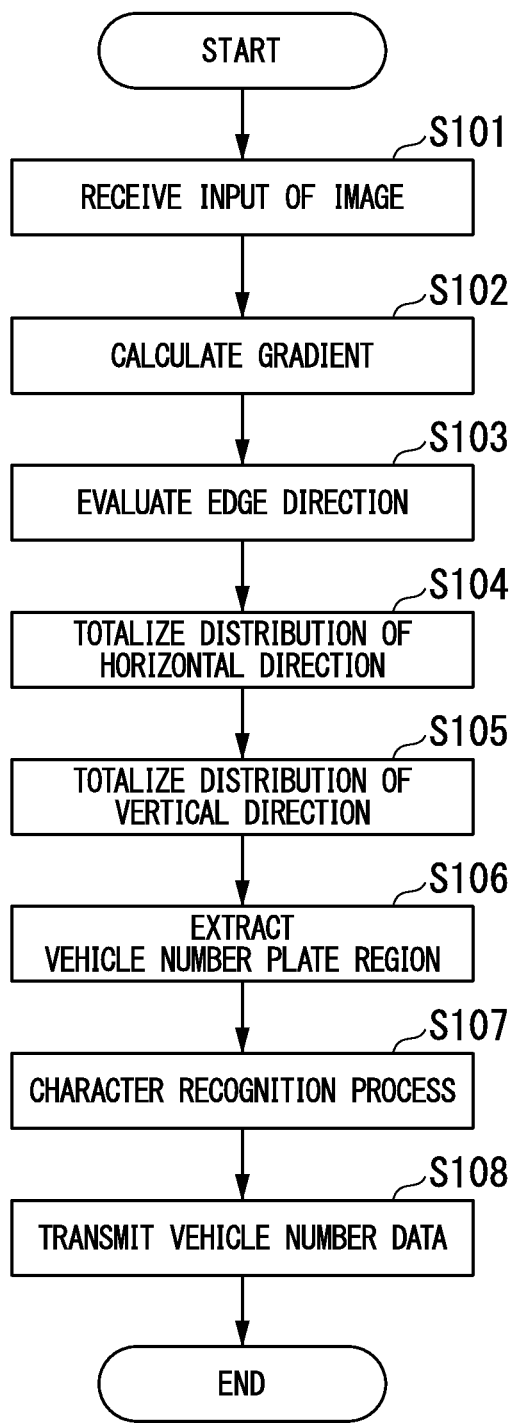
FIG. 6 is a diagram illustrating an example of an operation flow of the image recognition device 110.

FIG. 6 illustrates an example of an operation flow of the image recognition device 110. In the description of this operation flow, FIGS. 1 to 5 will be referred to together.

The CCTV camera 130 photographs a predetermined region on a road, for example, at a shutter speed of about $\frac{1}{1000}$ sec. At this time, the auxiliary light source 150 emits light in synchronization with the shutter speed of the CCTV camera 130. Then, the CCTV camera 130 outputs an image obtained in imaging to the image recognition device 110 every time the imaging is performed.

The image input reception unit 111 of the image recognition device 110 transmits the image to the gradient calculation unit 112 and the character recognition-processing unit 117 every time the input of the image output from the CCTV camera 130 is received (S101).

When the image transmitted from the image input reception unit 111 is received, the gradient calculation unit 112 of the image recognition device 110 calculates a gradient value in each of the horizontal and vertical directions of each coordinate while performing raster scanning on the image (S102). For example, the gradient calculation unit 112 calculates a gradient value f(row) of the horizontal direction of each coordinate of the image as shown in Formula (1). In addition, for example, the gradient calculation unit 112 calculates a gradient value f(col) of the vertical direction of each coordinate of the image as shown in Formula (2). Here, f(i, j) is a pixel value of coordinates (i, j).

[Math 1]

$$f(\text{row}) = f(i+1, j) - f(i, j) \quad (1)$$

[Math 2]

$$f(\text{col}) = f(i, j+1) - f(i, j) \quad (2)$$

Then, every time the gradient value is calculated in each of the horizontal and vertical directions of each coordinate, the gradient calculation unit 112 transmits data indicating the coordinate, the gradient value f(row) of the horizontal direction of the coordinate, and the gradient value f(col) of the vertical direction of the coordinate to the edge direction evaluation unit 113.

When data transmitted from the gradient calculation unit 112 is received, the edge direction evaluation unit 113 of the image recognition device 110 evaluates a direction of an edge at the coordinate indicated by the data (S103). For example, the edge direction evaluation unit 113 calculates a direction θ of the edge at the coordinate based on the gradient value f(row) of the horizontal direction of the coordinate and the gradient value f(col) of the vertical direction of the coordinate indicated by the data received from the gradient calculation unit 112 as shown in Formula (3).

[Math 3]

$$\theta = \tan^{-1}\left(\frac{f(col)}{f(row)}\right) \quad (3)$$

Here, a character available for the vehicle number plate is represented in a predetermined font. Thus, a direction of an outline of the character available for the vehicle number plate tends to be biased in a specific direction. For example, a direction (horizontal direction) of an outline of 0° and a direction (vertical direction) of an outline of 90° have a particularly high abundance ratio. Therefore, the edge direction evaluation unit 113 determines whether a deviation amount between the direction θ of the edge at the calculated coordinate and 0° or 90° is less than a predetermined deviation amount threshold value. Here, the predetermined deviation amount threshold value is considered because the vehicle number plate is unlikely to be necessarily shown horizontally or at an assumed angle. For example, the predetermined deviation amount threshold value becomes, for example, about ±5°. Then, when the deviation amount between the direction θ of the edge at the coordinate and 0° or 90° is less than the predetermined deviation amount threshold value, the edge direction evaluation unit 113 evaluates the direction of the edge at the coordinate by assigning one point to the coordinate. On the other hand, when the deviation amount between the direction θ of the edge at the coordinate and 0° or 90° is greater than the predetermined deviation amount threshold value, the edge direction evaluation unit 113 evaluates the direction of the edge at the coordinate without assigning points to the coordinate. Then, the edge direction evaluation unit 113 transmits data indicating the coordinate and the points at the coordinate to the horizontal distribution totalization unit 114 and the vertical distribution totalization unit 115. In addition, the direction of the outline of 0° and the direction of the outline of 90° may be examples of "a direction of an outline of an abundance ratio higher than a predetermined abundance ratio threshold value among directions of the outline of the character available for the vehicle number plate" in the present invention.

When the data transmitted from the edge direction evaluation unit 113 is received, the horizontal distribution totalization unit 114 of the image recognition device 110 totalizes the distribution of the horizontal direction of the points indicated by the data (S104). For example, the horizontal distribution totalization unit 114 adds the points of coordinates (i, j), (i, j+1), (i, j+2), . . . and uses an addition result as a total value of the points of the coordinate i of the horizontal direction. In this manner, when the total value at each coordinate of the coordinates i, i+1, i+2, . . . of the horizontal direction is calculated, the horizontal distribution totalization unit 114 transmits data indicating the distribution of the points of the horizontal direction to the vehicle number plate region extraction unit 116.

When the data transmitted from the edge direction evaluation unit 113 is received, the vertical distribution totalization unit 115 of the image recognition device 110 totalizes the distribution of the vertical direction of the points indicated by the data (S105). For example, the vertical distribution totalization unit 115 adds the points of coordinates (i, j), (i+1, j), (i+2, j), . . . and uses an addition result as a total value of the points of the coordinate j of the vertical direction. In this manner, when the total value at each coordinate of the coordinates j, j+1, j+2, . . . of the horizontal direction is calculated, the vertical distribution totalization unit 115 transmits data indicating the distribution of the points of the vertical direction to the vehicle number plate region extraction unit 116.

When the data transmitted from the horizontal distribution totalization unit 114 and the vertical distribution totalization unit 115 is received, the vehicle number plate region extraction unit 116 of the image recognition device 110 extracts a region of the vehicle number plate from the image based on the distribution of the points indicated by the data (S106). For example, the vehicle number plate region extraction unit 116 specifies a total value Vi_max in which the distribution of the points of the horizontal direction among distributions of the points of the horizontal direction indicated by the data received from the horizontal distribution totalization unit 114 is maximized. Then, the vehicle number plate region extraction unit 116 calculates a value Vi_threshold by multiplying the total value Vi_max by a predetermined coefficient α (here, 0<α<1). Then, the vehicle number plate region extraction unit 116 specifies the coordinate i_left of the horizontal direction of the image in which the total value initially becomes the total value Vi_threshold as illustrated in FIG. 3 by searching for the distribution of the points of the horizontal direction in a direction from coordinates of a left end of the image to a right end. In addition, the vehicle number plate region extraction unit 116 specifies the coordinate i_right of the horizontal direction of the image in which the total value initially becomes the total value Vi_threshold as illustrated in FIG. 3 by searching for the distribution of the points of the horizontal direction in a direction from coordinates of the right end of the image to the left end. Likewise, the vehicle number plate region extraction unit 116 specifies a total value Vj_max in which the distribution of the points of the vertical direction among distributions of the points of the vertical direction indicated by the data received from the vertical distribution totalization unit 115 is maximized. Then, the vehicle number plate region extraction unit 116 calculates a value Vj_threshold by multiplying the total value Vj_max by a predetermined coefficient β (here, 0<β<1). Then, the vehicle number plate region extraction unit 116 specifies the coordinate j_upper of the vertical direction of the image in which the total value initially becomes the total value Vj_threshold as illustrated in FIG. 4 by searching for the distribution of the points of the vertical direction in a direction from coordinates of an upper end of the image to a lower end. In addition, the vehicle number plate region extraction unit 116 specifies the coordinate j_lower of the vertical direction of the image in which the total value initially becomes the total value Vj_threshold as illustrated in FIG. 4 by searching for the distribution of the points of the vertical direction in a direction from coordinates of the lower end of the image to the upper end. Then, as illustrated in FIG. 5, the vehicle number plate region extraction unit 116 extracts a region surrounded by start point coordinates (i_left, j_upper) and end point coordinates (i_right, j_lower) as a region of a vehicle number plate. Then, the vehicle number plate region extraction unit 116 transmits data indicating the start point coordinates (i_left, j_upper) and the end point coordinates (i_right, j_lower) of the extracted region of the vehicle number plate to the character recognition-processing unit 117.

When the image transmitted from the image input reception unit 111 is received and the data transmitted from the vehicle number plate region extraction unit 116 is received, the character recognition-processing unit 117 of the image recognition device 110 recognizes the vehicle number by performing a character recognition process while targeting the region of the vehicle number plate surrounded by the start point coordinates (i_left, j_upper) and the end point coordinates (i_right, j_lower) indicated by the data received from the vehicle number plate region extraction unit 116 from the image received from the image input reception unit 111 (S107). For example, in the character recognition, a pattern matching scheme in which high-speed calculation is possible, a scheme of extracting a feature quantity of each character, calculating a distance from a standard pattern, and performing separation by the calculated distance, a scheme of directly giving a character pattern to a neural network or the like, or the like is adopted. Then, the character recognition-processing unit 117 transmits data indicating a recognized vehicle number to the vehicle number data transmission unit 118.

When the data transmitted from the character recognition-processing unit 117 is received, the vehicle number data transmission unit 118 of the image recognition device 110 transmits the data to the host computer 170 (S108).

In this manner, the host computer 170 is configured to perform a process using information of the vehicle number indicated by the data transmitted from the image recognition device 110.

As described above, the image recognition device 110 according to the first embodiment evaluates a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value. Then, the image recognition device 110 extracts a region of the vehicle number plate from the image based on the distribution of the assigned points.

In this manner, as compared to the known technology, the image recognition device 110 according to the first embodiment can extract a region of the vehicle number plate from an image at a higher speed and accurately.

In addition, as described above, the image recognition device 110 according to the first embodiment totalizes the distribution of the horizontal direction of the assigned points. Then, the image recognition device 110 extracts a region of the horizontal direction of the vehicle number plate from the image based on the totalized distribution of the points of the horizontal direction.

In this manner, the image recognition device 110 according to the first embodiment can extract a region of the horizontal direction of the vehicle number plate from the image at a high speed and accurately.

In addition, as described above, the image recognition device 110 according to the first embodiment totalizes the distribution of the vertical direction of the assigned points. Then, the image recognition device 110 extracts the region of the vertical direction of the vehicle number plate from the image based on the totalized distribution of the points of the vertical direction.

In this manner, the image recognition device 110 according to the first embodiment can extract a region of the vertical direction of the vehicle number plate from the image at a high speed and accurately.

Figure 7:
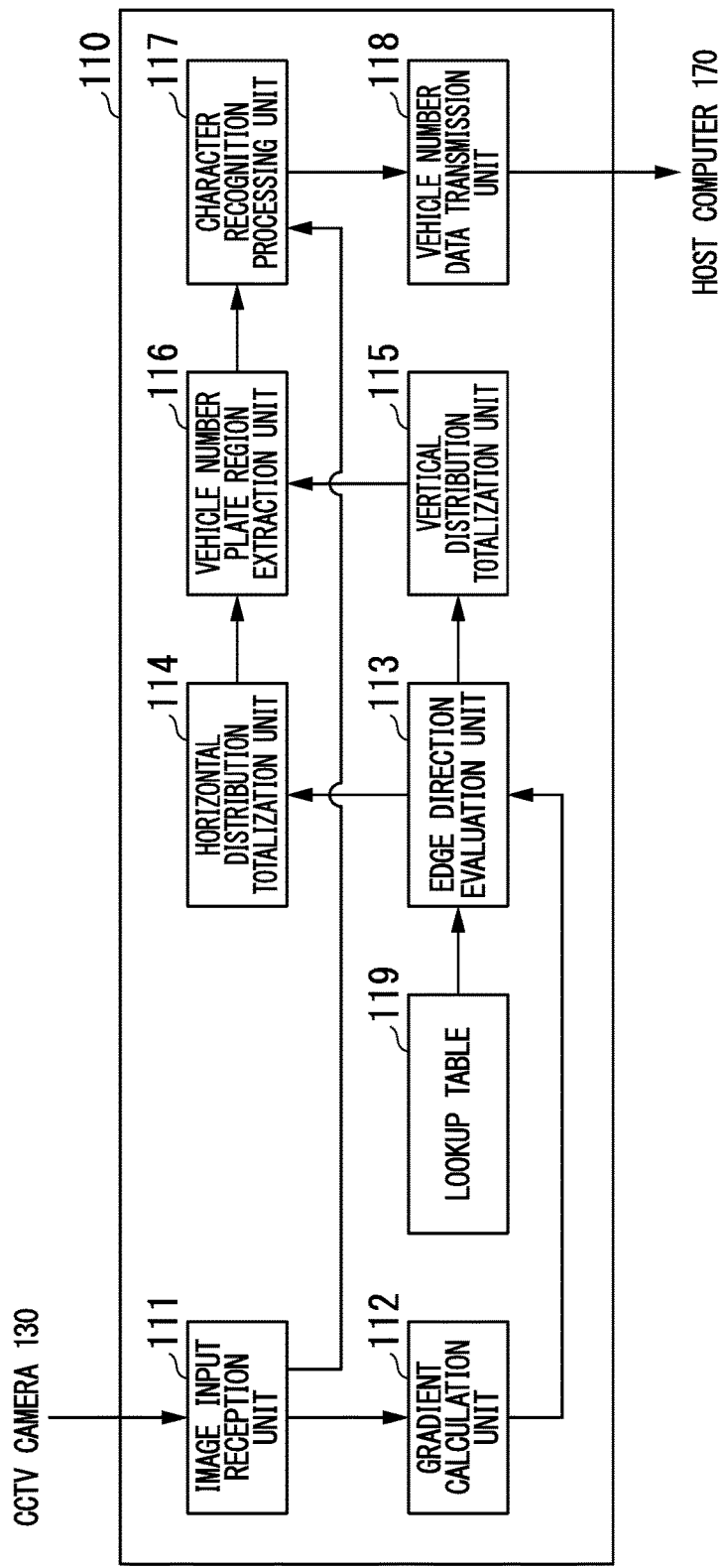
FIG. 7 is a diagram illustrating an example of a block configuration of an image recognition device 110 according to a second embodiment.

FIG. 7 illustrates an example of a block configuration of an image recognition device 110 according to a second embodiment. The image recognition device 110 according to the second embodiment includes an image input reception unit 111, a gradient calculation unit 112, an edge direction evaluation unit 113, a horizontal distribution totalization unit 114, a vertical distribution totalization unit 115, a vehicle number plate region extraction unit 116, a character recognition-processing unit 117, a vehicle number data transmission unit 118, and a lookup table 119. In the following description, functions and operations of the components will be described in detail.

In addition, among the components of the image recognition device 110 according to the second embodiment, the components having the same names and denoted by the same reference signs as those of the components of the image recognition device 110 according to the first embodiment exhibit similar functions and operations. Therefore, detailed description thereof will be omitted in the following description.

The lookup table 119 is a table in which the points, which is an evaluation result of the direction θ of an edge specified by each combination, is stored with respect to all combinations of gradient values f(row) of the horizontal direction and gradient values f(col) of the vertical direction. For example, when a deviation amount between the direction θ of the edge specified by the combination of the gradient value f(row) of the horizontal direction and the gradient value f(col) of the vertical direction and 0° or 90° is less than a predetermined deviation amount threshold value, the points indicating one point is stored for the combination of the gradient value f(row) of the horizontal direction and the gradient value f(col) of the vertical direction. In addition, for example, when a deviation amount between the direction θ of the edge specified by the combination of the gradient value f(row) of the horizontal direction and the gradient value f(col) of the vertical direction and 0° or 90° is greater than the predetermined deviation amount threshold value, the points indicating 0 points is stored for the combination of the gradient value f(row) of the horizontal direction and the gradient value f(col) of the vertical direction.

Figure 8:
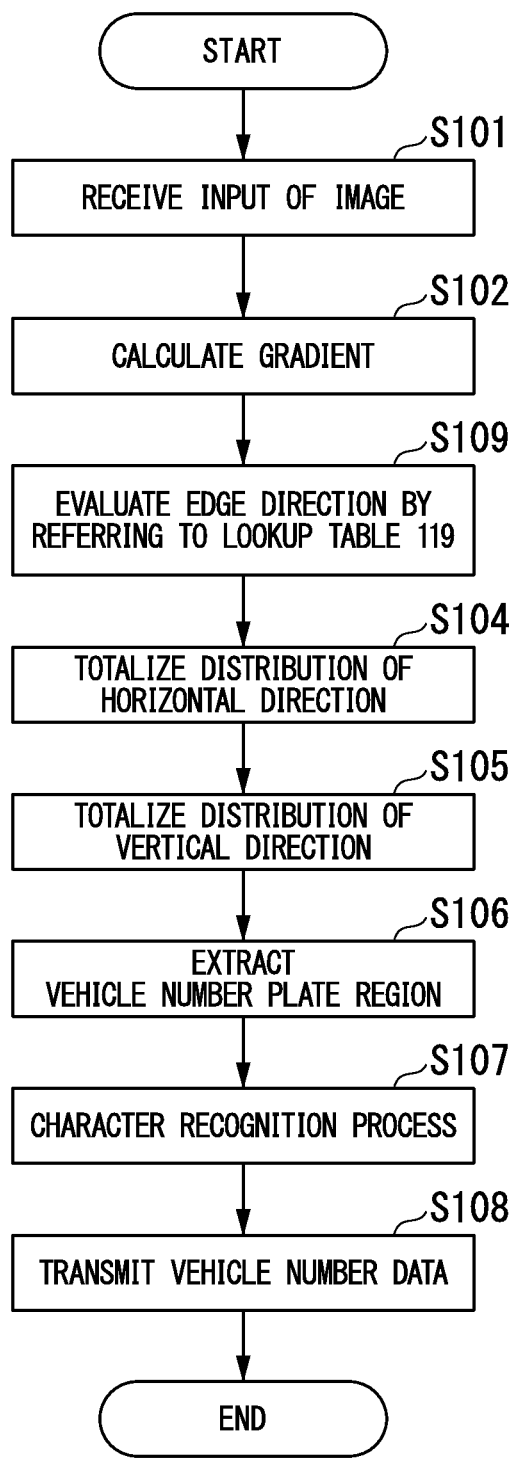
FIG. 8 is a diagram illustrating an example of an operation flow of the image recognition device 110 according to the second embodiment.

FIG. 8 illustrates an example of an operation flow of the image recognition device 110 according to the second embodiment. In the description of this operation flow, FIGS. 1 to 7 will be referred to together. In addition, among the operation steps of the image recognition device 110 according to the second embodiment, the operation steps having the same names and denoted by the same reference signs as those of the operation steps of the image recognition device 110 according to the first embodiment exhibit similar operations. Therefore, detailed description thereof will be omitted in the following description.

When data transmitted from the gradient calculation unit 112 is received, the edge direction evaluation unit 113 of the image recognition device 110 reads the points stored for the combination of the gradient value f(row) of the horizontal direction and the gradient value f(col) of the vertical direction indicated by the data received from the gradient calculation unit 112 among information about the points stored in the lookup table 119. Then, the edge direction evaluation unit 113 designates the points read from the lookup table 119 as an evaluation result of the direction of the edge at a coordinate indicated by the data received from the gradient calculation unit 112 (S109). Then, the edge direction evaluation unit 113 transmits the data indicating the coordinate and the points at the coordinate to the horizontal distribution totalization unit 114 and the vertical distribution totalization unit 115.

As described above, the image recognition device 110 according to the second embodiment evaluates the direction of the edge by referring to the lookup table 119.

In this manner, the image recognition device 110 according to the second embodiment can extract a region of a vehicle number plate from an image at a higher speed.

Figure 9:
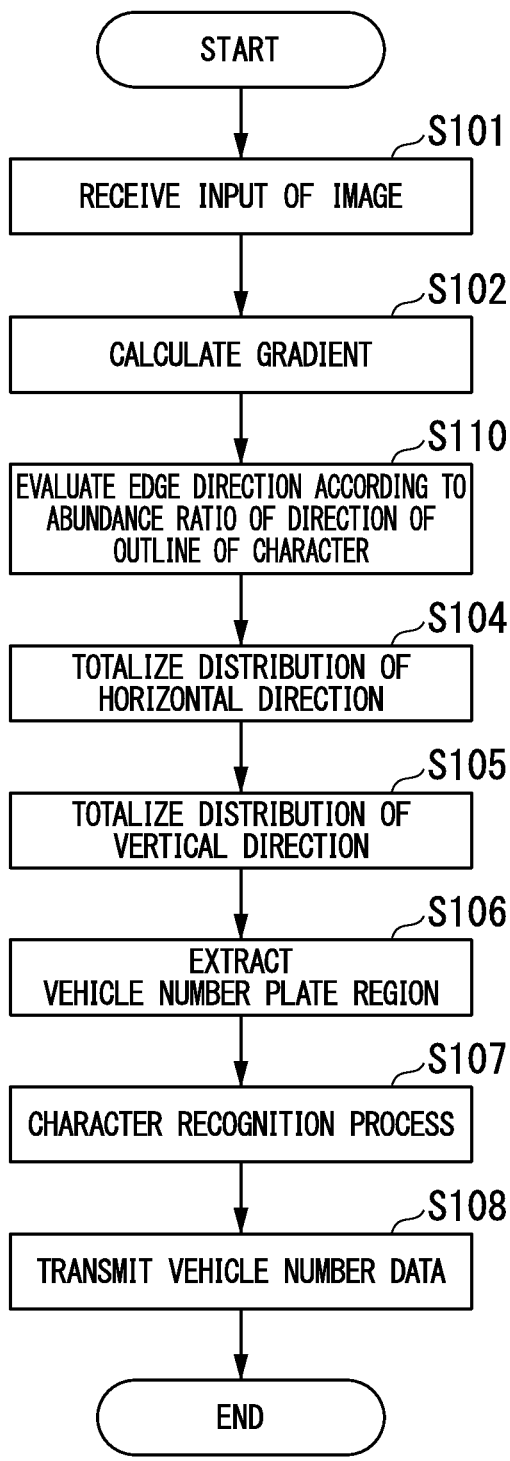
FIG. 9 is a diagram illustrating an example of an operation flow of an image recognition device 110 according to a third embodiment.

FIG. 9 illustrates an example of an operation flow of an image recognition device 110 according to a third embodiment. In the description of this operation flow, FIGS. 1 to 8 will be referred to together. In addition, among the operation steps of the image recognition device 110 according to the third embodiment, the operation steps having the same names and denoted by the same reference signs as those of the operation steps of the image recognition device 110 according to the first embodiment exhibit similar operations. Therefore, detailed description thereof will be omitted in the following description.

When data transmitted from the gradient calculation unit 112 is received, the edge direction evaluation unit 113 of the image recognition device 110 evaluates a direction of an edge at the coordinate indicated by the data (S110). For example, the edge direction evaluation unit 113 calculates a direction θ of an edge at the coordinate as shown in Formula (3) based on the gradient value f(row) of the horizontal direction of the coordinate and the gradient value f(col) of the vertical direction of the coordinate indicated by data received from the gradient calculation unit 112. Here, a character available for the vehicle number plate is represented in a predetermined font. Thus, a direction of an outline of the character available for the vehicle number plate tends to be biased in a specific direction. For example, a direction of an outline of 0° and a direction of an outline of 90° have a particularly high abundance ratio. In addition, a direction of the outline of 45° is designated at an abundance ratio which is high next to the direction of the outline of 0° or 90°. In this case, the edge direction evaluation unit 113 determines whether a deviation amount between the direction θ of the edge at the calculated coordinate and 0°, 45°, or 90° is less than a predetermined deviation amount threshold value. Here, the predetermined deviation amount threshold value is considered because the vehicle number plate is unlikely to be necessarily shown horizontally. For example, the predetermined deviation amount threshold value becomes, for example, about ±5°. Then, when the deviation amount between a direction θ of the edge at the coordinate and 0° or 90° is less than the predetermined deviation amount threshold value, the edge direction evaluation unit 113 evaluates the direction of the edge at the coordinate by assigning five points to the coordinate. In addition, when the deviation amount between the direction θ of the edge at the coordinate and 45° is less than the predetermined deviation amount threshold value, the edge direction evaluation unit 113 evaluates the direction of the edge at the coordinate by assigning three points to the coordinate.

On the other hand, when the deviation amount between the direction θ of the edge at the coordinate and 0°, 45°, or 90° is greater than the predetermined deviation amount threshold value, the edge direction evaluation unit 113 evaluates the direction of the edge at the coordinate without assigning points to the coordinate. Then, the edge direction evaluation unit 113 transmits data indicating the coordinate and the points at the coordinate to the horizontal distribution totalization unit 114 and the vertical distribution totalization unit 115.

When a deviation amount between a direction of an outline of a character available for the vehicle number plate and the direction of the edge is less than a predetermined deviation amount threshold value as described above, the image recognition device 110 according to the third embodiment assigns points differing according to an abundance ratio of the direction of the outline.

In this manner, as compared to the image recognition device 110 according to the first embodiment, the image recognition device 110 according to the third embodiment can extract the region of the vertical direction of the vehicle number plate from the image with higher precision.

Figure 10:
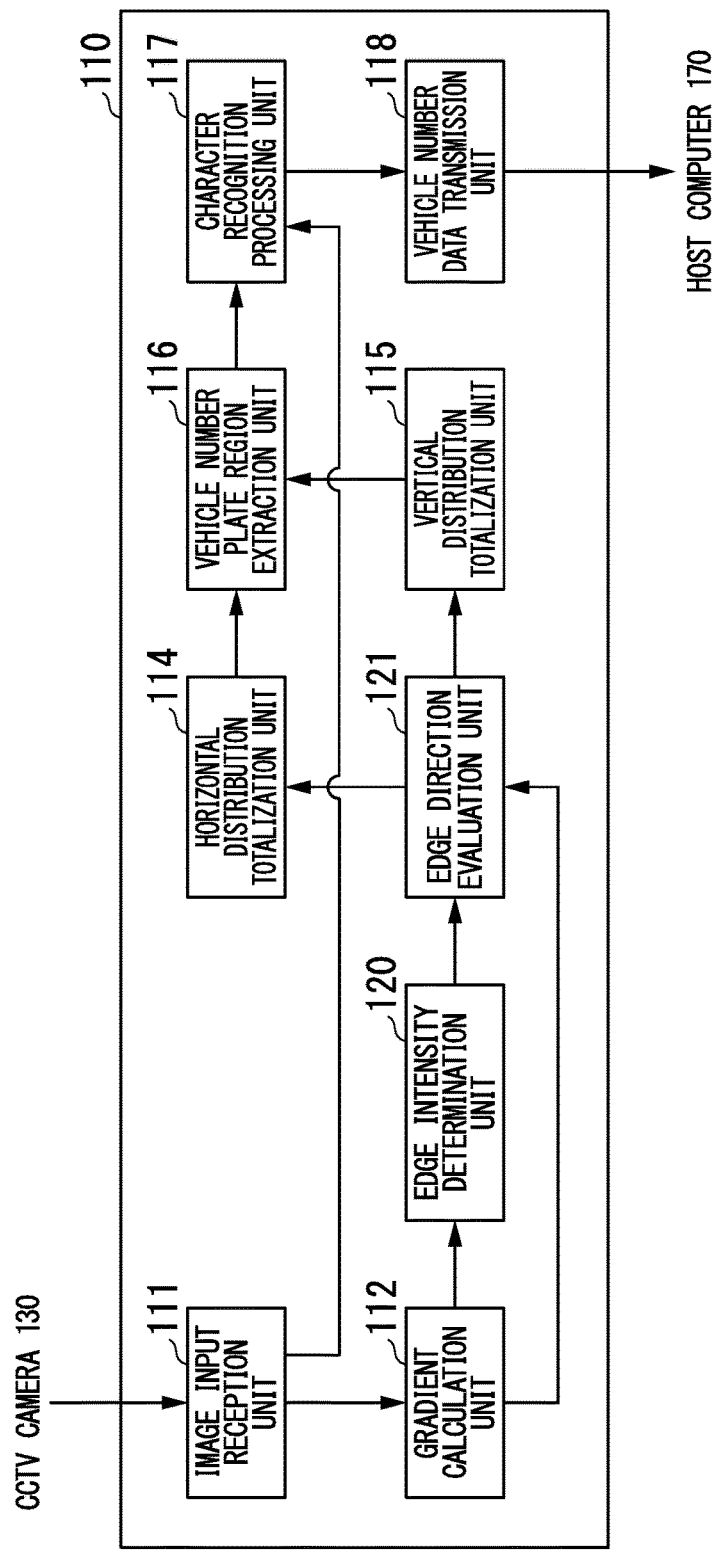
FIG. 10 is a diagram illustrating an example of a block configuration of an image recognition device 110 according to a fourth embodiment.

FIG. 10 illustrates an example of a block configuration of an image recognition device 110 according to a fourth embodiment. The image recognition device 110 according to the fourth embodiment includes an image input reception unit 111, a gradient calculation unit 112, an edge intensity determination unit 120, an edge direction evaluation unit 121, a horizontal distribution totalization unit 114, a vertical distribution totalization unit 115, a vehicle number plate region extraction unit 116, a character recognition-processing unit 117, and a vehicle number data transmission unit 118. In the following description, functions and operations of the components will be described in detail.

In addition, among the components of the image recognition device 110 according to the fourth embodiment, the components having the same names and denoted by the same reference signs as those of the components of the image recognition device 110 according to the first embodiment exhibit similar functions and operations. Therefore, detailed description thereof will be omitted in the following description.

The edge intensity determination unit 120 determines whether an intensity of an edge of each coordinate of an image is greater than a predetermined intensity threshold value.

The edge direction evaluation unit 121 evaluates a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value. For example, if the edge intensity determination unit 120 determines that the intensity of the edge is less than the predetermined intensity threshold value, the edge direction evaluation unit 121 does not assign points to the coordinate even when the deviation amount between the direction of the outline of the character available for the vehicle number plate and the direction of the edge at each coordinate is less than the predetermined deviation amount threshold value.

Figure 11:
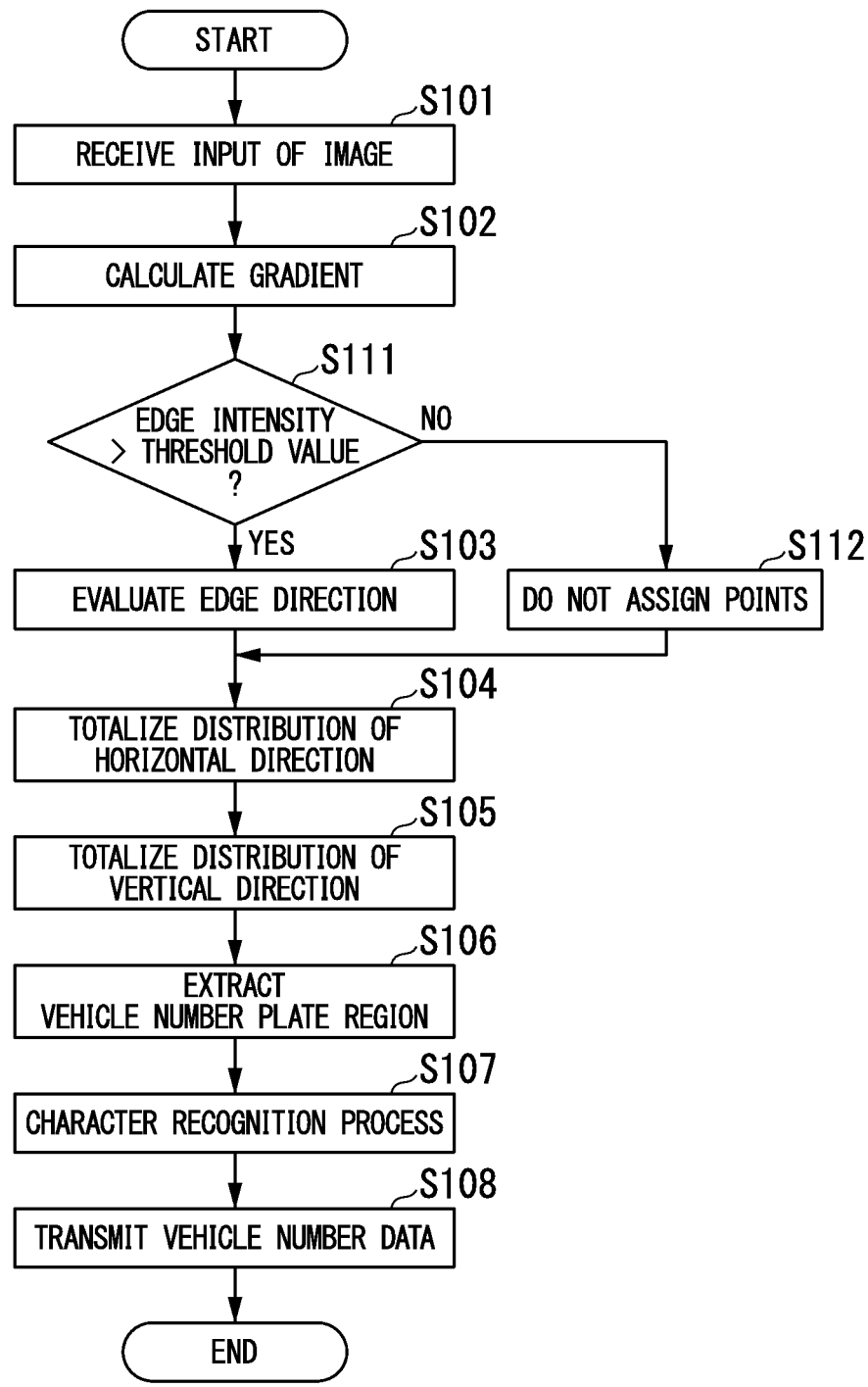
FIG. 11 is a diagram illustrating an example of an operation flow of the image recognition device 110 according to the fourth embodiment.

FIG. 11 illustrates an example of an operation flow of the image recognition device 110 according to the fourth embodiment. In the description of this operation flow, FIGS. 1 to 10 will be referred to together. In addition, among the operation steps of the image recognition device 110 according to the fourth embodiment, the operation steps having the same names and denoted by the same reference signs as those of the operation steps of the image recognition device 110 according to the first embodiment exhibit similar operations. Therefore, detailed description thereof will be omitted in the following description.

Every time a gradient value is calculated in each direction of the horizontal and vertical directions of each coordinate, the gradient calculation unit 112 of the image recognition device 110 transmits data indicating the coordinate, the gradient value f(row) of the horizontal direction of the coordinate, and the gradient value f(col) of the vertical direction of the coordinate to the edge intensity determination unit 120 and the edge direction evaluation unit 121.

When the data transmitted from the gradient calculation unit 112 is received, the edge intensity determination unit 120 of the image recognition device 110 determines whether the intensity of the edge at the coordinate indicated by the data is greater than a predetermined intensity threshold value (S111). For example, the edge intensity determination unit 120 calculates the intensity of the edge at the coordinate based on the gradient value f(row) of the horizontal direction of the coordinate and the gradient value f(col) of the vertical direction of the coordinate indicated by the data received from the gradient calculation unit 112 as shown in Formula (4) or (5).

[Math 4]

$$\text{Intensity of edge} = \sqrt{(f(\text{row}))^2 + (f(\text{col}))^2} \quad (4)$$

[Math 5]

$$\text{Intensity of edge} = |f(\text{row})| + |f(\text{col})| \quad (5)$$

Here, in general, as compared to a pixel value of the vehicle number plate main body, a pixel value of the outline portion of the character of the vehicle number plate has a significant change. Therefore, the intensity of the edge at the coordinate in the vicinity of the vehicle number plate main body is said to be strong. On the other hand, a pixel value of an uneven portion or the like of a road surface has a small change. Therefore, the intensity of the edge of a coordinate in the vicinity of the uneven portion of the road surface is said to be weak. However, the direction θ of the edge at the coordinate may indicate the same direction regardless of an intensity level of the edge intensity.

Thus, it is necessary to ignore the edge at the coordinate in the vicinity of the uneven portion of the road surface or the like as noise. Therefore, the edge intensity determination unit 120 determines whether the calculated edge intensity is greater than a predetermined intensity threshold value. For example, when the pixel value of the outline portion of the character of the vehicle number plate having a significant change as compared to the pixel value of the vehicle number plate main body is targeted, the intensity threshold value is set to a large value. On the other hand, when the pixel value of the outline portion of the character of the vehicle number plate to be prevented from excessively changing as compared to the pixel value of the vehicle number plate main body is targeted, the intensity threshold value is set to a small value. Then, when it is determined that the intensity of the edge at the coordinate is greater than the predetermined intensity threshold value, the edge intensity determination unit 120 transmits data indicating the coordinate and a determination result to the edge direction evaluation unit 121.

If the determination result indicated by the data received from the edge direction evaluation unit 121 is a determination result indicating that "the intensity of the edge at the coordinate is less than the predetermined intensity threshold value" when the data transmitted from the gradient calculation unit 112 is received and the data transmitted from the edge direction evaluation unit 121 is received (S111: NO), the edge direction evaluation unit 121 of the image recognition device 110 does not assign points to the coordinate even when the deviation amount between the direction of the outline of the character available for the vehicle number plate and the direction of the edge at each coordinate is less than the predetermined deviation amount threshold value (S112). On the other hand, if the determination result indicated by the data received from the edge direction evaluation unit 121 is a determination result indicating that "the intensity of the edge at the coordinate is greater than the predetermined intensity threshold value" (S111: Yes), the edge direction evaluation unit 121 evaluates the direction of the edge at the coordinate indicated by the data transmitted from the gradient calculation unit 112 (S103).

As described above, the image recognition device 110 according to the fourth embodiment determines whether the intensity of the edge at each coordinate of the image is greater than the predetermined intensity threshold value. Then, when the edge intensity determination unit determines that the intensity of the edge is less than the predetermined intensity threshold value, the image recognition device 110 does not assign points to the coordinate even when the deviation amount between the direction of the outline of the character available for the vehicle number plate and the direction of the edge at each coordinate is less than the predetermined deviation amount threshold value.

In this manner, the image recognition device 110 according to the fourth embodiment can ignore the edge at the coordinate in the vicinity of the uneven portion of the road surface or the like as noise.

Figure 12:
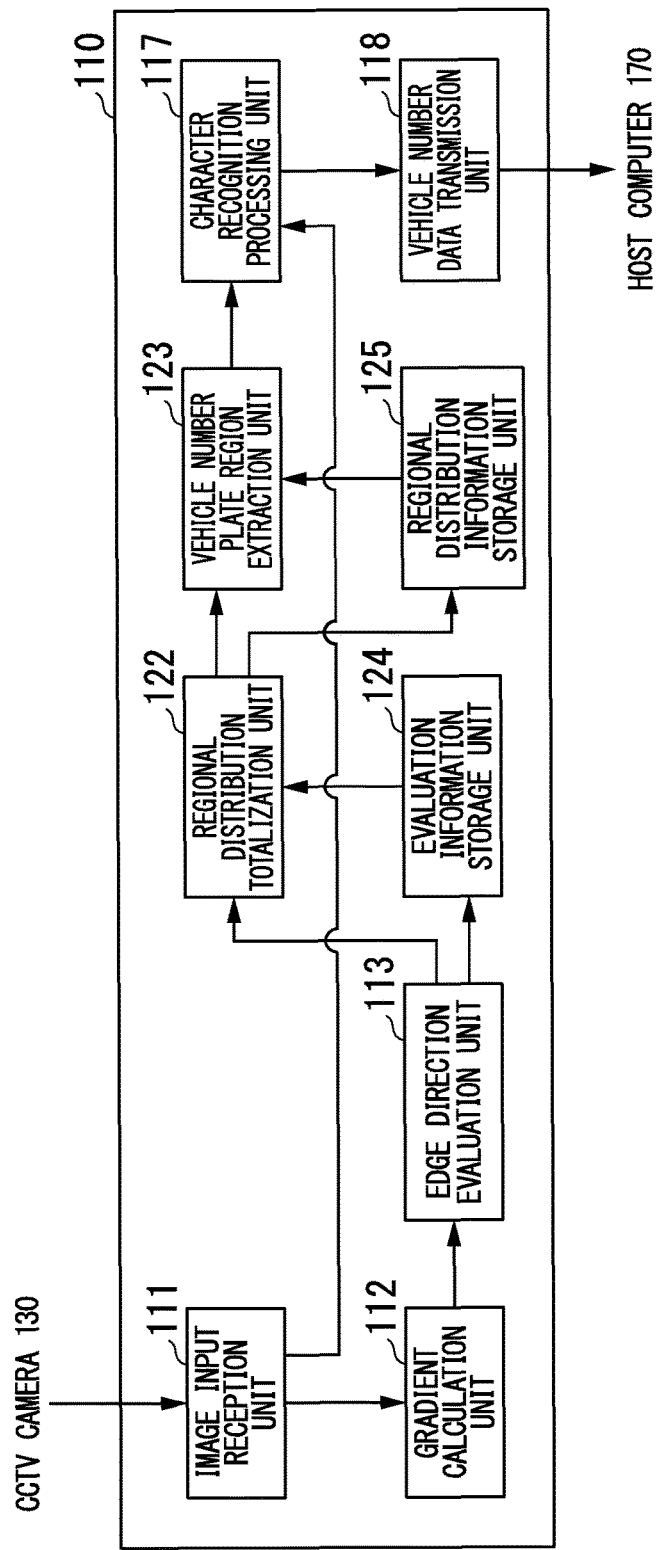
FIG. 12 is a diagram illustrating an example of a block configuration of an image recognition device 110 according to a fifth embodiment.

FIG. 12 illustrates an example of a block configuration of an image recognition device 110 according to a fifth embodiment. The image recognition device 110 according to the fifth embodiment includes an image input reception unit 111, a gradient calculation unit 112, an edge direction evaluation unit 113, a regional distribution totalization unit 122, a vehicle number plate region extraction unit 123, a character recognition-processing unit 117, a vehicle number data transmission unit 118, an evaluation information storage unit 124, and a regional distribution information storage unit 125. In the following description, functions and operations of the components will be described in detail.

In addition, among the components of the image recognition device 110 according to the fifth embodiment, the components having the same names and denoted by the same reference signs as those of the components of the image recognition device 110 according to the first embodiment exhibit similar functions and operations. Therefore, detailed description thereof will be omitted in the following description.

The regional distribution totalization unit 122 totalizes a distribution of each predetermined region of the points assigned by the edge direction evaluation unit 113.

The vehicle number plate region extraction unit 123 extracts a region of a vehicle number plate from an image based on the distribution of the points assigned by the edge direction evaluation unit 113. For example, the vehicle number plate region extraction unit 123 extracts the region of the vehicle number plate from the image based on the distribution of the points of each predetermined region totalized by the regional distribution totalization unit 122.

In the evaluation information storage unit 124, information about the points assigned to each coordinate is stored.

In the regional distribution information storage unit 125, information about the distribution of the points of each predetermined region is stored.

FIG. 13 illustrates an example of information stored in the evaluation information storage unit 124 in the form of a table. In the evaluation information storage unit 124, information about the coordinate and the points is associated and stored.

The information about the coordinate is information indicating the coordinate of a target image in which the direction of the edge is evaluated by the edge direction evaluation unit 113. The information about the points is information indicating the points assigned to the coordinate indicated by the information about the coordinate.

FIG. 14 illustrates an example of information stored in the regional distribution information storage unit 125 in the form of a table.

In the regional distribution information storage unit 125, information about start point coordinates, end point coordinates, and the points is associated and stored.

In this embodiment, when the regional distribution totalization unit 122 totalizes the distribution of the points of each rectangular region, information about the start point coordinates is information indicating upper-left coordinates of the rectangular region in which the regional distribution totalization unit 122 totalizes the distribution of the points. In addition, the information about the end point coordinates is information indicating lower-right coordinates of the rectangular region in which the regional distribution totalization unit 122 totalizes the distribution of the points. The information about the points is information indicating a total of the points within the rectangular region surrounded by the coordinates indicated by the start point coordinates and the coordinates indicated by the end point coordinates.

Figure 15:
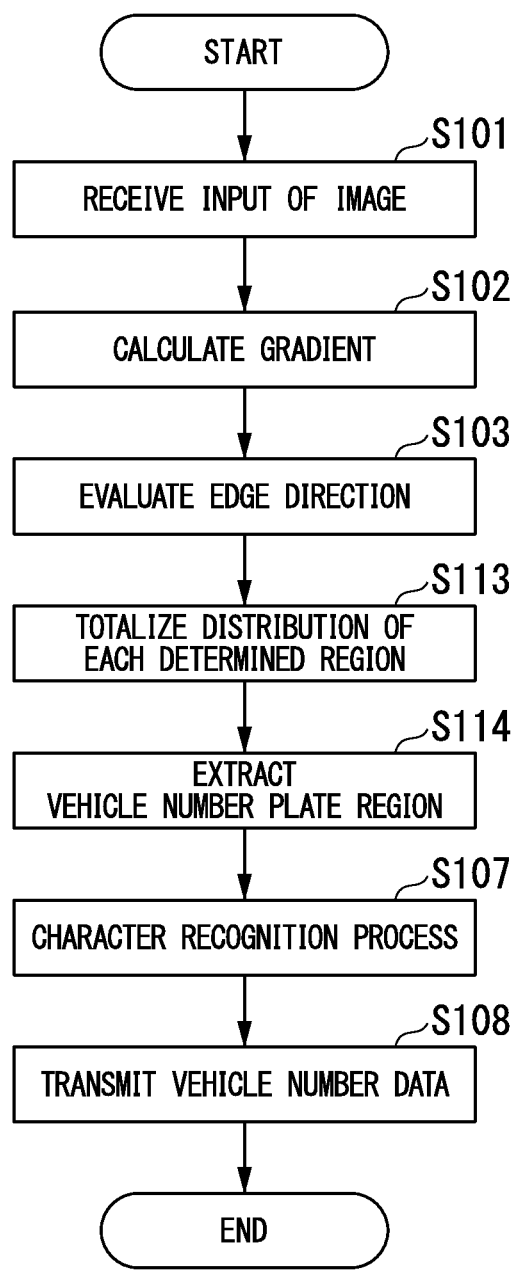
FIG. 15 is a diagram illustrating an example of an operation flow of the image recognition device 110 according to the fifth embodiment.

FIG. 15 illustrates an example of an operation flow of the image recognition device 110 according to the fifth embodiment. In the description of this operation flow, FIGS. 1 to 14 will be referred to together. In addition, among the operation steps of the image recognition device 110 according to the fifth embodiment, the operation steps having the same names and denoted by the same reference signs as those of the operation steps of the image recognition device 110 according to the first embodiment exhibit similar operations. Therefore, detailed description thereof will be omitted in the following description.

The edge direction evaluation unit 113 of the image recognition device 110 stores information in the evaluation information storage unit 124 by associating the information about the coordinate and information about the points at the coordinate every time the direction of the edge is evaluated at the coordinate. In this manner, information as illustrated in FIG. 13 is configured to be stored in the evaluation information storage unit 124. Then, when the evaluation of directions of edges at all coordinates of the image ends, the edge direction evaluation unit 113 transmits data indicating the end to the regional distribution totalization unit 122.

When the data transmitted from the edge direction evaluation unit 113 is received, the regional distribution totalization unit 122 of the image recognition device 110 totalizes a distribution of each predetermined region of the points assigned by the edge direction evaluation unit 113 by referring to information stored in the evaluation information storage unit 124 (S113). For example, the size of the predetermined region is designated to be the same as the assumed size of the vehicle number plate on the image when the vehicle number plate is imaged or designated to be a size of a rectangular region smaller than the vehicle number plate on the image. The regional distribution totalization unit 122 performs totalization by adding the points within the predetermined region while gradually shifting the predetermined region with respect to all regions of the image. Then, the regional distribution totalization unit 122 stores information in the regional distribution information storage unit 125 by associating information about the start point coordinates of the predetermined region, information about the end point coordinates of the predetermined region, and information about the points totalized within the predetermined region. In this manner, in the regional distribution information storage unit 125, information as illustrated in FIG. 14 is configured to be stored. Here, the regional distribution totalization unit 122 may perform totalization while shifting the predetermined region by one pixel, by a plurality of pixels, or randomly. Then, when the totalization of the distribution of the points of each predetermined region ends for all regions of an image, the regional distribution totalization unit 122 transmits data indicating the end to the vehicle number plate region extraction unit 123.

When the data transmitted from the regional distribution totalization unit 122 is received, the vehicle number plate region extraction unit 123 of the image recognition device 110 extracts the region of the vehicle number plate from the image by referring to the information stored in the regional distribution information storage unit 125 (S114). For example, the vehicle number plate region extraction unit 123 reads all information about the start point coordinates and information about the end point coordinates stored in association with information about the points greater than a predetermined points threshold value among information stored in the regional distribution information storage unit 125. Then, the vehicle number plate region extraction unit 123 extracts a rectangular region surrounding all rectangular regions surrounded by the coordinates indicated by the information about the start point coordinates and the coordinates indicated by the information about the end point coordinates read from the regional distribution information storage unit 125 as a region of the vehicle number plate. Then, the vehicle number plate region extraction unit 123 transmits data indicating upper-left coordinates and lower-right coordinates of the extracted region of the vehicle number plate to the character recognition-processing unit 117.

As described above, the image recognition device 110 according to the fifth embodiment totalizes the distribution of the points of each predetermined region. Then, the image recognition device 110 extracts a region of the vehicle number plate from the image based on the totalized distribution of the points of each predetermined region.

In this manner, as compared to the image recognition device 110 according to the first embodiment, the image recognition device 110 according to the fifth embodiment can extract a region of the vehicle number plate from the image with higher precision.

Figure 16:
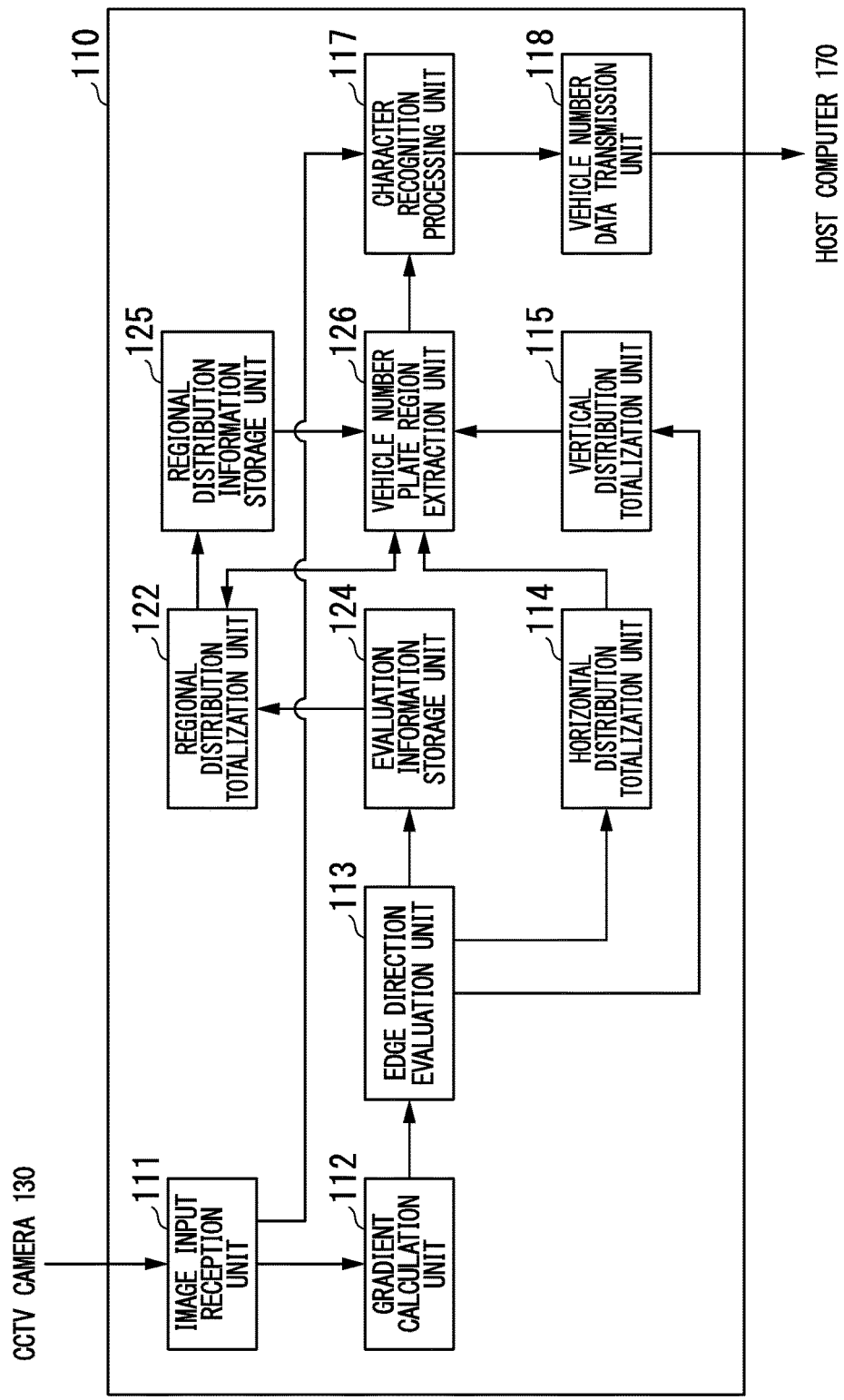
FIG. 16 is a diagram illustrating an example of a block configuration of the image recognition device 110 according to a sixth embodiment.

FIG. 16 illustrates an example of a block configuration of the image recognition device 110 according to a sixth embodiment. The image recognition device 110 according to the sixth embodiment includes an image input reception unit 111, a gradient calculation unit 112, an edge direction evaluation unit 113, a horizontal distribution totalization unit 114, a vertical distribution totalization unit 115, a regional distribution totalization unit 122, a vehicle number plate region extraction unit 126, a character recognition-processing unit 117, a vehicle number data transmission unit 118, an evaluation information storage unit 124, and a regional distribution information storage unit 125. In the following description, functions and operations of the components will be described in detail.

In addition, among the components of the image recognition device 110 according to the sixth embodiment, the components having the same names and denoted by the same reference signs as those of the components of the image recognition device 110 according to the first embodiment or those of the components of the image recognition device 110 according to the fifth embodiment exhibit similar functions and operations. Therefore, detailed description thereof will be omitted in the following description.

The vehicle number plate region extraction unit 126 extracts a region of the vehicle number plate from the image based on a distribution of the points assigned by the edge direction evaluation unit 113. For example, the vehicle number plate region extraction unit 126 extracts the region of the horizontal direction of the vehicle number plate from the image based on the distribution of the points of the horizontal direction totalized by the horizontal distribution totalization unit 114. In addition, for example, the vehicle number plate region extraction unit 126 extracts the region of the vertical direction of the vehicle number plate from the image based on the distribution of the points of the vertical direction totalized by the vertical distribution totalization unit 115. In addition, for example, the vehicle number plate region extraction unit 126 extracts the region of the vehicle number plate from the image based on the distribution of the points of each predetermined region totalized by the regional distribution totalization unit 122.

Figure 17:
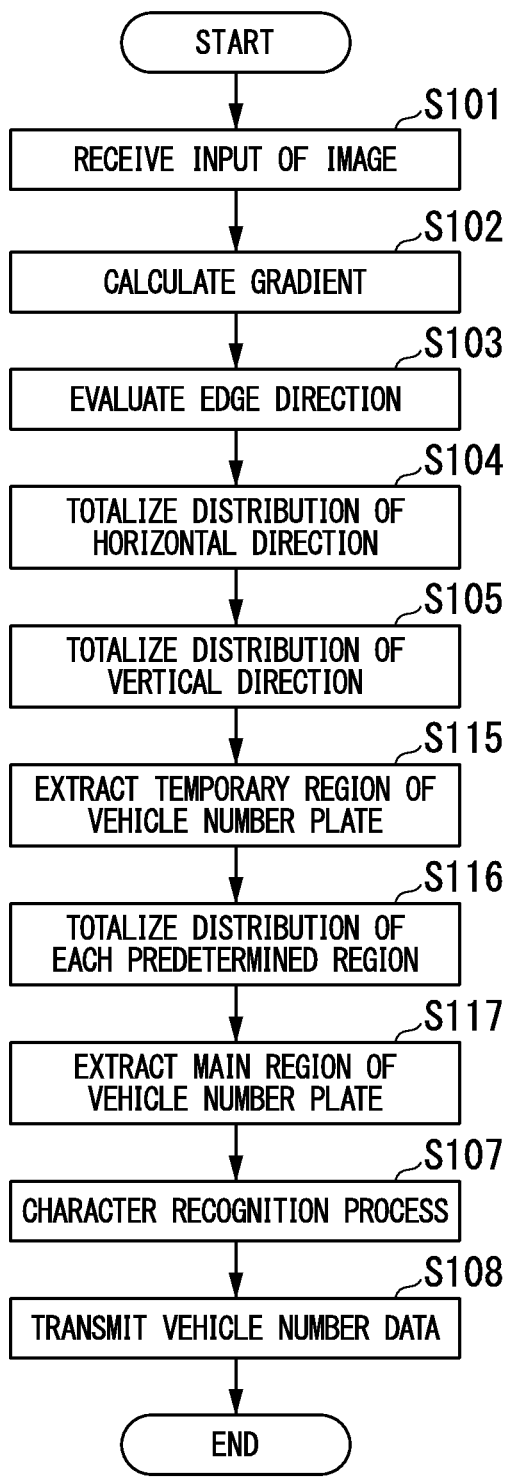
FIG. 17 is a diagram illustrating an example of an operation flow of the image recognition device 110 according to the embodiment of FIG. 6.

FIG. 17 illustrates an example of an operation flow of the image recognition device 110 according to the sixth embodiment. In the description of this operation flow, FIGS. 1 to 16 will be referred to together. In addition, among the operation steps of the image recognition device 110 according to the sixth embodiment, the operation steps having the same names and denoted by the same reference signs as those of the operation steps of the image recognition device 110 according to the first embodiment or those of the operation steps of the image recognition device 110 according to the fifth embodiment exhibit similar operations. Therefore, detailed description thereof will be omitted in the following description.

Every time the direction of the edge at the coordinate is evaluated, the edge direction evaluation unit 113 of the image recognition device 110 transmits data indicating the coordinate and the points at the coordinate to the horizontal distribution totalization unit 114 and the vertical distribution totalization unit 115 and associates and stores the information in the evaluation information storage unit 124. In this manner, information as illustrated in FIG. 13 is configured to be stored in the evaluation information storage unit 124.

When the data transmitted from the horizontal distribution totalization unit 114 and the vertical distribution totalization unit 115 is received, the vehicle number plate region extraction unit 116 of the image recognition device 110 extracts a temporary region of the vehicle number plate from the image based on the distribution of the points indicated by the data (S115). For example, the vehicle number plate region extraction unit 116 specifies a total value Vi_max in which the distribution of the points of the horizontal direction among distributions of the points of the horizontal direction indicated by the data received from the horizontal distribution totalization unit 114 is maximized. Then, the vehicle number plate region extraction unit 116 calculates a value Vi_threshold by multiplying the total value Vi_max by a predetermined coefficient $\alpha$ (here, $0<\alpha<1$). Then, the vehicle number plate region extraction unit 116 specifies a coordinate i_left of the horizontal direction of the image in which the total value initially becomes a value Vi_threshold as illustrated in FIG. 3 by searching for the distribution of the points of the horizontal direction in a direction from coordinates of a left end of the image to a right end. In addition, the vehicle number plate region extraction unit 116 specifies a coordinate i_right of the horizontal direction of the image in which the total value initially becomes a value Vi_threshold as illustrated in FIG. 3 by searching for the distribution of the points of the horizontal direction in a direction from coordinates of the right end of the image to the left end. Likewise, the vehicle number plate region extraction unit 116 specifies a total value Vj_max in which the distribution of the points of the vertical direction among distributions of the points of the vertical direction indicated by the data received from the vertical distribution totalization unit 115 is maximized. Then, the vehicle number plate region extraction unit 116 calculates a value Vj_threshold by multiplying the total value Vj_max by a predetermined coefficient $\alpha$ (here, $0<\alpha<1$). Then, the vehicle number plate region extraction unit 116 specifies a coordinate j_upper of the vertical direction of the image in which the total value initially becomes a value Vj_threshold as illustrated in FIG. 4 by searching for the distribution of the points of the vertical direction in a direction from coordinates of an upper end of the image to a lower end. In addition, the vehicle number plate region extraction unit 116 specifies a coordinate j_lower of the vertical direction of the image in which the total value initially becomes a value Vj_threshold as illustrated in FIG. 4 by searching for the distribution of the points of the vertical direction in a direction from coordinates of the lower end of the image to the upper end. Then, as illustrated in FIG. 5, the vehicle number plate region extraction unit 116 extracts a region surrounded by start point coordinates (i_left, j_upper) and end point coordinates (i_right, j_lower) as a temporary region of the vehicle number plate.

Then, the vehicle number plate region extraction unit 116 transmits data indicating the start point coordinates (i_left, j_upper) and the end point coordinates (i_right, j_lower) of the extracted temporary region of the vehicle number plate to the regional distribution totalization unit 122.

When the data transmitted from the vehicle number plate region extraction unit 116 is received, the regional distribution totalization unit 122 of the image recognition device 110 totalizes the distribution of each predetermined region of the points assigned by the edge direction evaluation unit 113 by referring to the information stored in the evaluation information storage unit 124 for the temporary region of the vehicle number plate surrounded by the start point coordinates (i_left, j_upper) and the end point coordinates (i_right, j_lower) indicated by the data (S116). For example, the size of the predetermined region is designated to be the same as the assumed size of the vehicle number plate on the image when the vehicle number plate is imaged or designated to be a size of a rectangular region smaller than the vehicle number plate on the image. The regional distribution totalization unit 122 performs totalization by adding the points within the predetermined region while gradually shifting the predetermined region with respect to the temporary region of the vehicle number plate. Then, the regional distribution totalization unit 122 stores information in the regional distribution information storage unit 125 by associating information about the start point coordinates of the predetermined region, information about the end point coordinates of the predetermined region, and information about the points totalized within the predetermined region. In this manner, in the regional distribution information storage unit 125, information as illustrated in FIG. 14 is configured to be stored. Here, the regional distribution totalization unit 122 may perform totalization while shifting the predetermined region by one pixel, by a plurality of pixels, or randomly. Then, when the totalization of the distribution of the points of each predetermined region ends with respect to the temporary region of the vehicle number plate, the regional distribution totalization unit 122 transmits data indicating the end to the vehicle number plate region extraction unit 123.

When the data transmitted from the regional distribution totalization unit 122 is received, the vehicle number plate region extraction unit 123 of the image recognition device 110 extracts a main region of the vehicle number plate from the image by referring to the information stored in the regional distribution information storage unit 125 (S117). For example, the vehicle number plate region extraction unit 123 reads all information about the start point coordinates and information about the end point coordinates stored in association with information about the points greater than a predetermined points threshold value among information stored in the regional distribution information storage unit 125. Then, the vehicle number plate region extraction unit 123 extracts a rectangular region surrounding all rectangular regions surrounded by the coordinates indicated by the information about the start point coordinates and the coordinates indicated by the information about the end point coordinates read from the regional distribution information storage unit 125 as the main region of the vehicle number plate. Then, the vehicle number plate region extraction unit 123 transmits data indicating upper-left coordinates and lower-right coordinates of the extracted main region of the vehicle number plate to the character recognition-processing unit 117.

As described above, the image recognition device 110 according to the sixth embodiment extracts the temporary region of the vehicle number plate from the image based on the totalized distribution of the points of the horizontal direction and the totalized distribution of the points of the vertical direction. Then, the image recognition device 110 extracts the main region of the vehicle number plate from among temporary regions of the vehicle number plate based on the totalized distribution of each predetermined region.

In this manner, the image recognition device 110 according to the sixth embodiment can extract the region of the vehicle number plate from the image with higher precision than the image recognition device 110 according to the first embodiment, and can extract the region of the vehicle number plate from the image at a higher speed than the image recognition device 110 according to the fifth embodiment.

Figure 18:
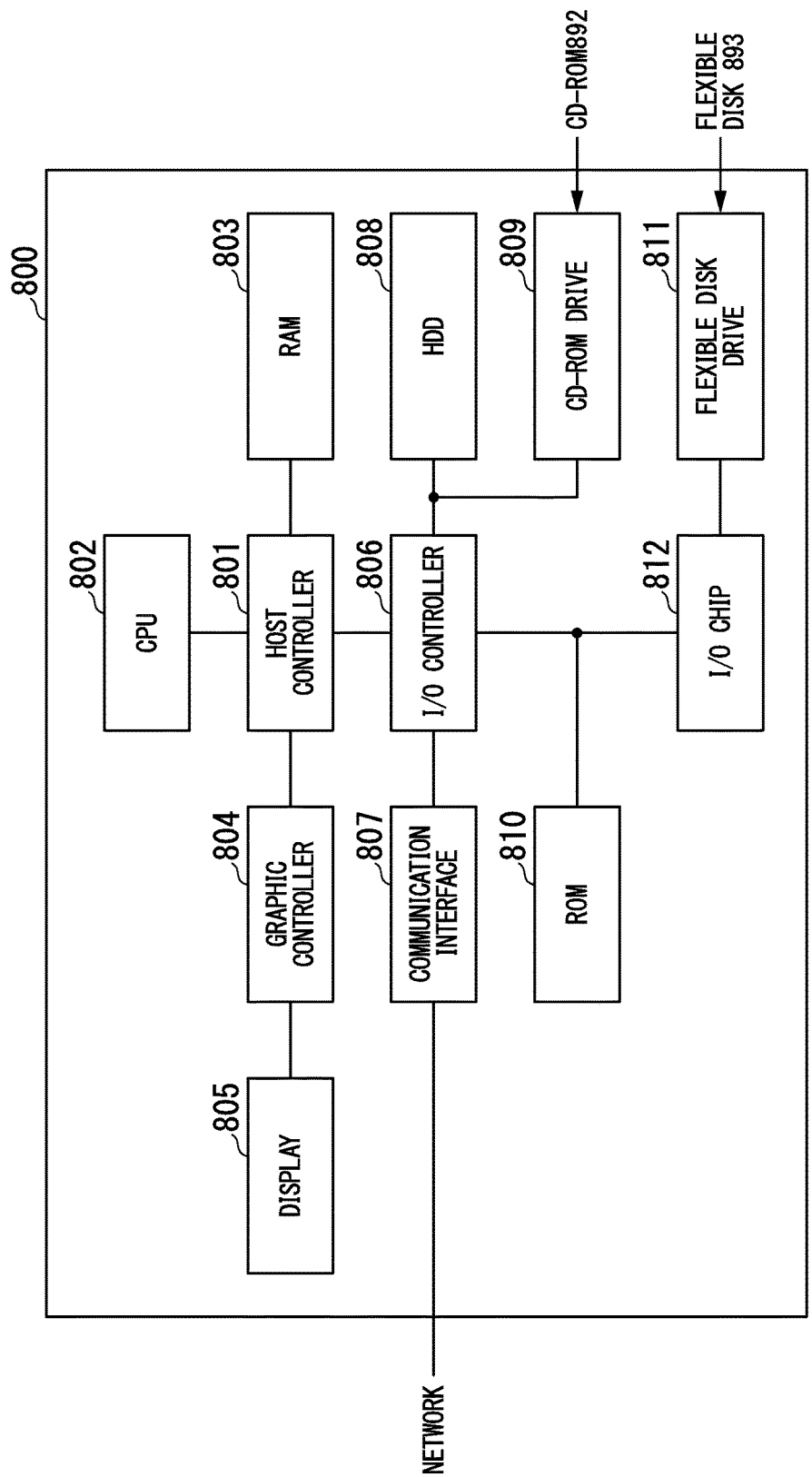
FIG. 18 is a diagram illustrating an example of a hardware configuration of a computer 800 constituting the image recognition device 110 according to this embodiment.

FIG. 18 illustrates an example of a hardware configuration of a computer 800 constituting the image recognition device 110 according to this embodiment. The computer 800 according to this embodiment includes a central processing unit (CPU) peripheral unit, an input/output (I/O) unit, and a legacy I/O unit, wherein the CPU peripheral unit includes a CPU 802, a random access memory (RAM) 803, a graphic controller 804, and a display 805 mutually connected via a host controller 801, the I/O unit includes a communication interface 807, a hard disk drive (HDD) 808, and a compact disc-read only memory (CD-ROM) drive 809 mutually connected via an I/O controller 806, and the legacy I/O unit includes a ROM 810, a flexible disk drive 811, and an I/O chip 812 connected to the I/O controller 806.

The host controller 801 connects the RAM 803 to the CPU 802 and the graphic controller 804 which access the RAM 803 at high transfer rates. The CPU 802 operates based on programs stored in the ROM 810 and the RAM 803 to control each part. The graphic controller 804 acquires image data generated by the CPU 802 or the like in a frame buffer provided in the RAM 803 and displays the image data on the display 805. In place of this, the graphic controller 804 may internally include a frame buffer which stores image data generated by the CPU 802 or the like.

The I/O controller 806 connects the host controller 801 to the communication interface 807, the HDD 808, and the CD-ROM drive 809 which are relatively high-speed I/O devices. The HDD 808 stores programs and data used by the CPU 802 within the computer 800. The CD-ROM drive 809 reads programs or data from a CD-ROM 892 and provides the programs or the data to the HDD 808 via the RAM 803.

The I/O controller 806 is also connected to the ROM 810, the flexible disk drive 811, and the I/O chip 812 which are relatively low-speed I/O devices. The ROM 810 stores a boot program to be executed when the computer 800 is activated and/or programs, etc. depending on hardware of the computer 800. The flexible disk drive 811 reads programs or data from a flexible disk 893 and provides the programs or the data to the HDD 808 via the RAM 803. The I/O chip 812 connects the flexible disk drive 811 to the I/O controller 806 and also connects various I/O devices to the I/O controller 806 via, for example, a parallel port, a serial port, a keyboard port, a mouse port, etc.

The programs supplied to the HDD 808 via the RAM 803 are stored on a recording medium, such as the flexible disk 893, the CD-ROM 892, or an integrated circuit (IC) card, and are provided to a user. The programs are read from the recording medium, installed on the HDD 808 within the computer 800 via the RAM 803, and executed in the CPU 802.

A program, which is installed in the computer 800 and causes the computer 800 to function as the image recognition device 110, causes the computer 800 to function as: an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value in steps S103, S109, and S110; and a vehicle number plate region extraction unit configured to extract the region of the vehicle number plate from the image in steps S106, S114, S115, and S117 based on a distribution of the points assigned by the edge direction evaluation unit.

Further, the program may cause the computer 800 to function as: an edge intensity determination unit configured to determine whether an intensity of the edge at each coordinate of the image is greater than a predetermined intensity threshold value in step S111 and the edge direction evaluation unit that does not assign points to the coordinate even when the deviation amount between the direction of the outline and the direction of the edge is less than the predetermined deviation amount threshold value in step S112 when the edge intensity determination unit determines that the intensity of the edge is less than the predetermined intensity threshold value.

Further, the program may cause the computer 800 to function as: a horizontal distribution totalization unit configured to totalize a distribution of the horizontal direction of the points assigned by the edge direction evaluation unit in step S104; and the vehicle number plate region extraction unit configured to extract a region of the horizontal direction of the vehicle number plate from the image in steps S106 and S115 based on the distribution of the points of the horizontal direction totalized by the horizontal distribution totalization unit.

Further, the program may cause the computer 800 to function as: a vertical distribution totalization unit configured to totalize a distribution of a vertical direction of the points assigned by the edge direction evaluation unit in step S105; and the vehicle number plate region extraction unit configured to extract a region of the vertical direction of the vehicle number plate from the image in steps S106 and S115 based on the distribution of the points of the vertical direction totalized by the vertical distribution totalization unit.

Further, the program may cause the computer 800 to function as: a regional distribution totalization unit configured to totalize a distribution of each predetermined region of the points assigned by the edge direction evaluation unit in steps S113 and S116; and the vehicle number plate region extraction unit configured to extract the region of the vehicle number plate from the image in steps S114 and S117 based on the distribution of the points of each predetermined region totalized by the regional distribution totalization unit.

Further, the program may cause the computer 800 to function as the edge direction evaluation unit assigns points differing according to the abundance ratio of the direction of the outline when the deviation amount between the direction of the outline and the direction of the edge is less than the predetermined deviation amount threshold value in step S110.

Information processing described in the program is loaded to the computer 800, which thereby functions as the image input reception unit, the gradient calculation unit, the edge direction evaluation unit, the horizontal distribution totalization unit, the vertical distribution totalization unit, the vehicle number plate region extraction unit, the character recognition-processing unit, the vehicle number data transmission unit, the lookup table, the edge intensity determination unit, the regional distribution totalization unit, the evaluation information storage unit, and the regional distribution information storage unit which are concrete means resulting from cooperation of software and various hardware resources described above. These concrete means implement calculation or processing of information according to the usage of the computer 800 in this embodiment, whereby the characteristic image recognition device 110 according to the usage is constructed.

For example, when the computer 800 performs communication with an external device or the like, the CPU 802 executes a communication program loaded to the RAM 803 and instructs the communication interface 807 to perform communication processing based on processing content written in the communication program. Under control of the CPU 802, the communication interface 807 reads transmission data stored in a transmission buffer region or the like provided on a storage device, such as the RAM 803, the HDD 808, the flexible disk 893, or the CD-ROM 892 to transmit the transmission data to the network, or the communication interface 807 writes reception data received from the network to a reception buffer region or the like provided on the storage device. In this manner, the communication interface 807 may transfer transmission/reception data from and to the storage device using a direct memory access method. In place of this, the CPU 802 reads data from a storage device or the communication interface 807 at a transfer source, and writes the data to the communication interface 807 or a storage device at a transfer destination, whereby transmission/reception data may be transferred.

In addition, the CPU 802 loads all or a necessary part of a file or a database stored in an external storage device such as the HDD 808, the CD-ROM 892, or the flexible disk 893 to the RAM 803 using the direct memory access transfer or the like. Then, the CPU 802 performs various types of processing on the data in the RAM 803. Then, the CPU 802 writes the processed data back to the external storage device using the direct memory access transfer or the like.

In such processing, because the RAM 803 is considered to temporarily store the content of the external storage device, the RAM 803, the external storage device, and the like are collectively referred to as a memory, a storage unit, or a storage device in this embodiment. Various types of information such as various programs, data, tables, and databases in this embodiment are stored in such a storage device and serve as information processing targets. In addition, the CPU 802 can also hold part of the RAM 803 in a cache memory and perform read and write operations on the cache memory. Even in such an embodiment, because the cache memory undertakes some of the functions of the RAM 803, it is assumed in this embodiment that the cache memory is included in the RAM 803, a memory, and/or a storage device, unless otherwise noted.

In addition, the CPU 802 performs various types of processing specified in an instruction sequence in a program on data read from the RAM 803. The various types of processing include various types of calculation, processing of information, condition determination, and retrieval and replacement of information described in this embodiment. Then, the CPU 802 writes the processed data back to the RAM 803. For example, when the CPU 802 performs condition determination, the CPU 802 compares each of the various variables shown in this embodiment to another variable or a constant and determines whether a condition is satisfied. The condition includes, for example, whether the variable is greater than the other variable or the constant, whether the variable is less than the other variable or the constant, whether the variable is equal to or greater than the other variable or the constant, whether the variable is equal to or less than the other variable or the constant, and whether the variable is equal to the other variable or the constant. The process branches to a different instruction sequence or a subroutine is called according to whether or not the condition is satisfied.

In addition, the CPU 802 can search for information stored in files or databases stored in storage devices. For example, when a plurality of entries each having an attribute value of a second attribute associated with an attribute value of a first attribute are stored in a storage device, the CPU 802 searches for an entry whose attribute value of the first attribute satisfies a specified condition from the plurality of entries stored in the storage device and reads the attribute value of the second attribute stored in the entry, thereby obtaining the attribute value of the second attribute associated with the first attribute satisfying the predetermined condition.

The above-described programs or modules may be stored in an external storage medium. In addition to the flexible disk 893 and the CD-ROM 892, for example, an optical recording medium such as a digital versatile disk (DVD) or a compact disk (CD), a magneto-optical recording medium such as a magneto-optical disk (MO), a tape medium, or a semiconductor memory such as an IC card can be used as the storage medium. In addition, a storage medium such as a hard disk or a RAM provided in a server system connected to a dedicated communication network or the Internet may be used as the recording medium, and the programs may be provided to the computer 800 via the network.

While the present invention has been described above using embodiments, the technical scope of the present invention is not limited to the scope of the description of the aforementioned embodiments. It is obvious to persons skilled in the art that various changes or improvements can be made in the aforementioned embodiments. It is obvious from the description of the claims that such changes or improvements are also included in the technical scope of the present invention.

It should be noted that, regarding the execution order of processes such as operations, procedures, steps, and stages in the devices, the systems, the programs, the methods, and the recording media described in the claims, the specification, and the drawings, expressions such as "before" and "prior to" are not explicitly given, and the devices, the systems, the programs, the methods, and the recording media can be implemented in any order unless the output of a preceding process is used by a following process. Even when operation flows in the claims, the specification, and the drawings are described using expressions such as "first" and "next" for convenience, this does not mean that such an order is required.

INDUSTRIAL APPLICABILITY

According to some aspects of the present invention, it is possible to extract a region of a vehicle number plate from an image.

REFERENCE SIGNS LIST

100 Vehicle number recognition system
110 Image recognition device
111 Image input reception unit
112 Gradient calculation unit
113 Edge direction evaluation unit
114 Horizontal distribution totalization unit
115 Vertical distribution totalization unit
116 Vehicle number plate region extraction unit
117 Character recognition-processing unit
118 Vehicle number data transmission unit
119 Lookup table
120 Edge intensity determination unit
121 Edge direction evaluation unit
122 Regional distribution totalization unit
123 Vehicle number plate region extraction unit
124 Evaluation information storage unit
125 Regional distribution information storage unit
126 Vehicle number plate region extraction unit
130 CCTV camera
150 Auxiliary light source
170 Host computer
800 Computer
801 Host controller
802 CPU
803 RAM
804 Graphics controller
805 Display
806 I/O controller
807 Communication interface
808 HDD
809 CD-ROM drive
810 ROM
811 Flexible disk drive
812 I/O chip
891 Network communication device
892 CD-ROM
893 Flexible disk
N Communication circuit

The invention claimed is:

1. An image recognition device for extracting a region of a vehicle number plate from an image, the image recognition device comprising:
an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and
a vehicle number plate region extraction unit configured to extract the region of the vehicle number plate from the image based on a distribution of the points assigned by the edge direction evaluation unit.

2. The image recognition device according to claim 1, further comprising:
an edge intensity determination unit configured to determine whether an intensity of the edge at each coordinate of the image is greater than a predetermined intensity threshold value,
wherein the edge direction evaluation unit does not assign points to the coordinate even when the deviation amount between the direction of the outline and the direction of the edge is less than the predetermined deviation amount threshold value if the edge intensity determination unit determines that the intensity of the edge is less than the predetermined intensity threshold value.

3. The image recognition device according to claim 1, further comprising:
a horizontal distribution totalization unit configured to totalize a distribution of the horizontal direction of the points assigned by the edge direction evaluation unit,
wherein the vehicle number plate region extraction unit extracts a region of the horizontal direction of the vehicle number plate from the image based on the distribution of the points of the horizontal direction totalized by the horizontal distribution totalization unit.

4. The image recognition device according to claim 1, further comprising:
a vertical distribution totalization unit configured to totalize a distribution of a vertical direction of the points assigned by the edge direction evaluation unit,
wherein the vehicle number plate region extraction unit extracts a region of the vertical direction of the vehicle number plate from the image based on the distribution of the points of the vertical direction totalized by the vertical distribution totalization unit.

5. The image recognition device according to claim 1, further comprising:
a regional distribution totalization unit configured to totalize a distribution of each predetermined region of the points assigned by the edge direction evaluation unit,
wherein the vehicle number plate region extraction unit extracts the region of the vehicle number plate from the image based on the distribution of the points of each predetermined region totalized by the regional distribution totalization unit.

6. The image recognition device according to claim 1, wherein the edge direction evaluation unit assigns points differing according to the abundance ratio of the direction of the outline when the deviation amount between the direction of the outline and the direction of the edge is less than the predetermined deviation amount threshold value.

7. An image recognition method of extracting a region of a vehicle number plate from an image, the image recognition method comprising:
an edge direction evaluation step of evaluating a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and a vehicle number plate region extraction step of extracting the region of the vehicle number plate from the image based on a distribution of the points assigned in the edge direction evaluation step.

8. A non-transitory computer readable medium containing a program for causing a computer to function as an image recognition device for extracting a region of a vehicle number plate from an image, the computer being caused to function as:
- an edge direction evaluation unit configured to evaluate a direction of an edge at each coordinate by assigning points to the coordinate when a deviation amount between a direction of an outline of an abundance ratio higher than a predetermined abundance ratio threshold value among directions of an outline of a character available for the vehicle number plate and the direction of the edge at each coordinate of the image is less than a predetermined deviation amount threshold value; and
- a vehicle number plate region extraction unit configured to extract the region of the vehicle number plate from the image based on a distribution of the points assigned by the edge direction evaluation unit.

* * * * *